Oct. 16, 1945.                S. B. WILLIAMS                2,386,763
                         RECORD CONTROLLED SYSTEM
                Filed Aug. 7, 1940        15 Sheets-Sheet 1

INVENTOR
S. B. WILLIAMS
BY P. C. Smith
ATTORNEY

Oct. 16, 1945.  S. B. WILLIAMS  2,386,763
RECORD CONTROLLED SYSTEM
Filed Aug. 7, 1940  15 Sheets-Sheet 3

FIG. 3

INVENTOR
S. B. WILLIAMS
BY
O. C. Smith
ATTORNEY

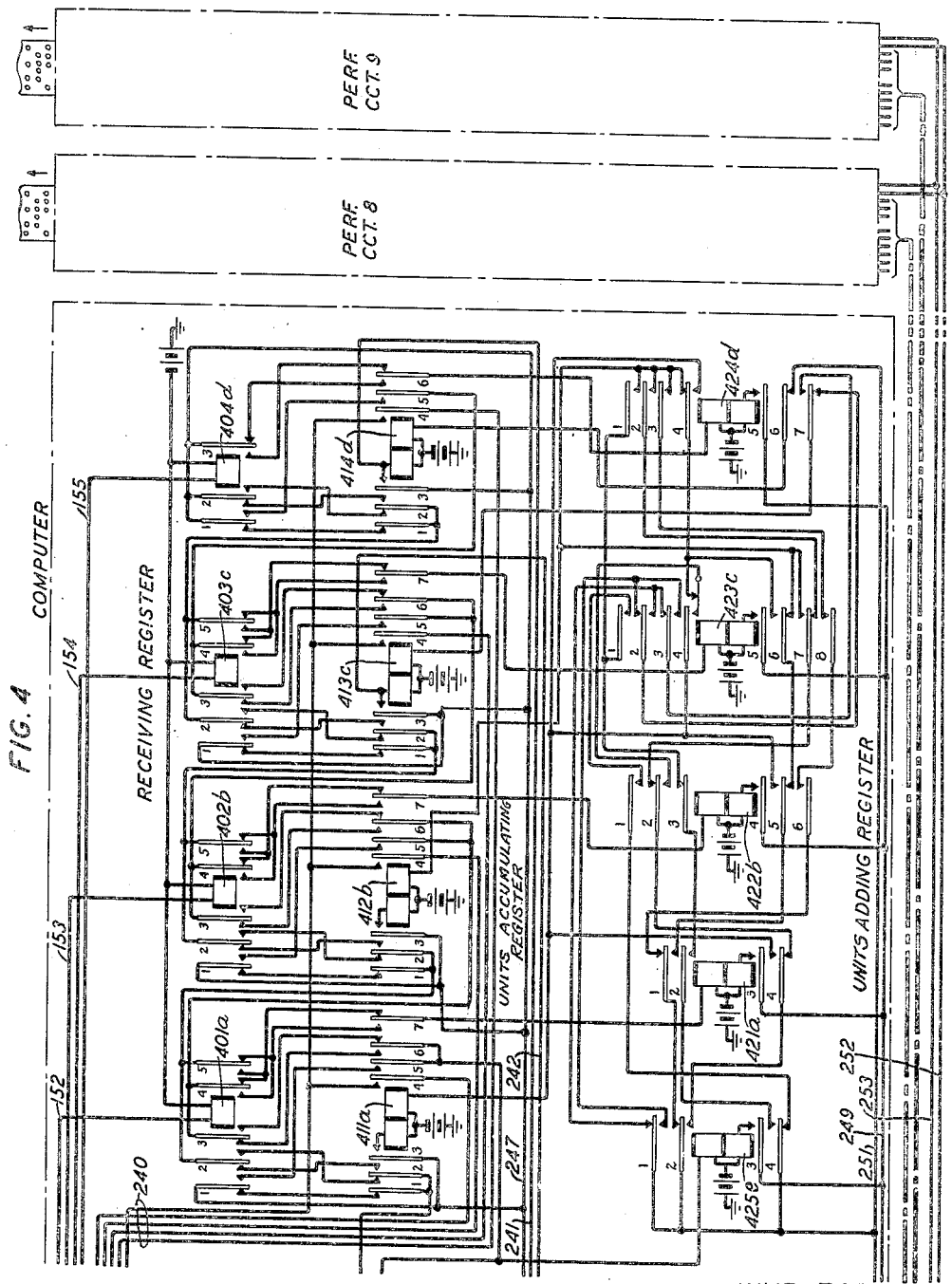

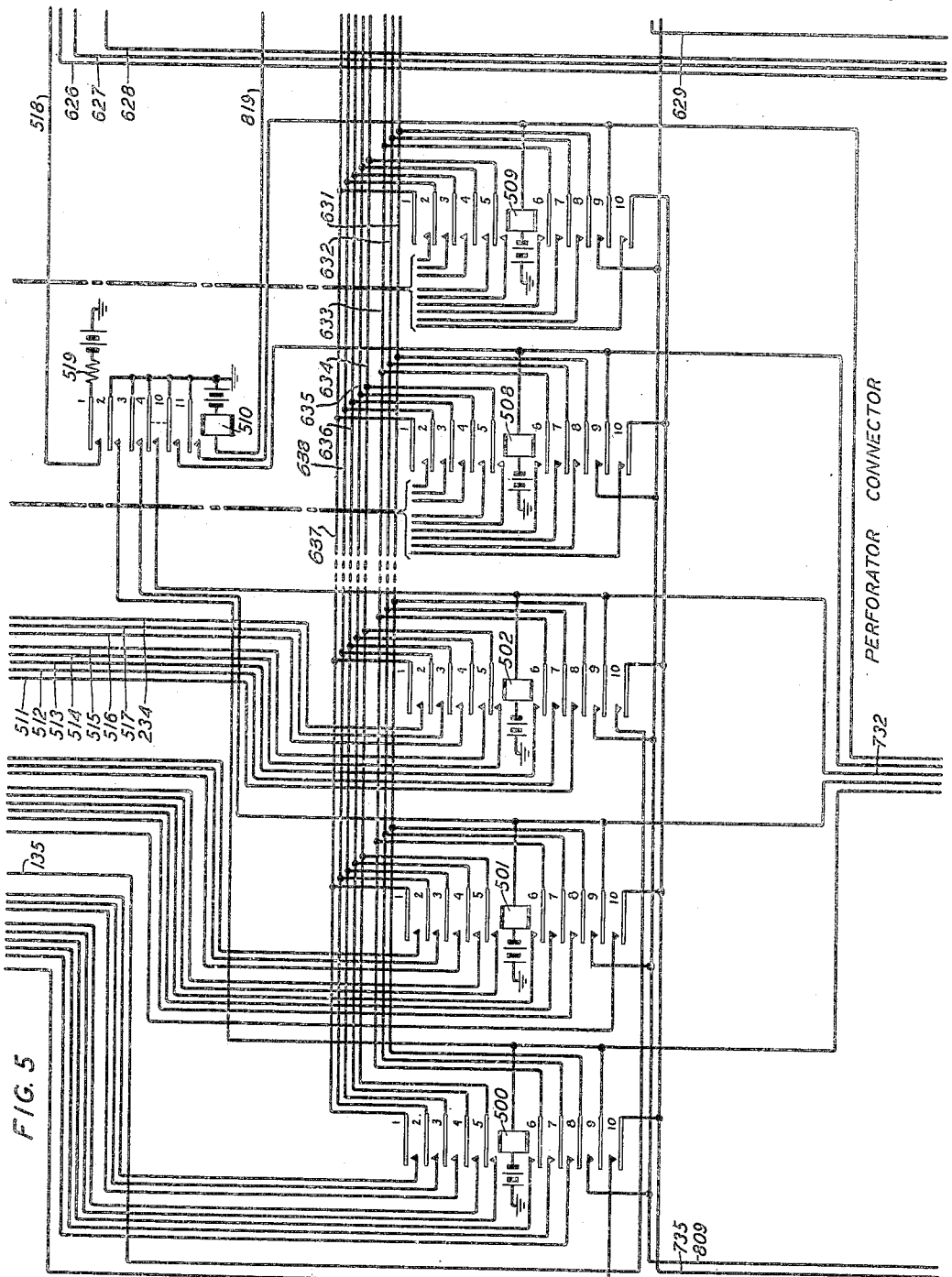

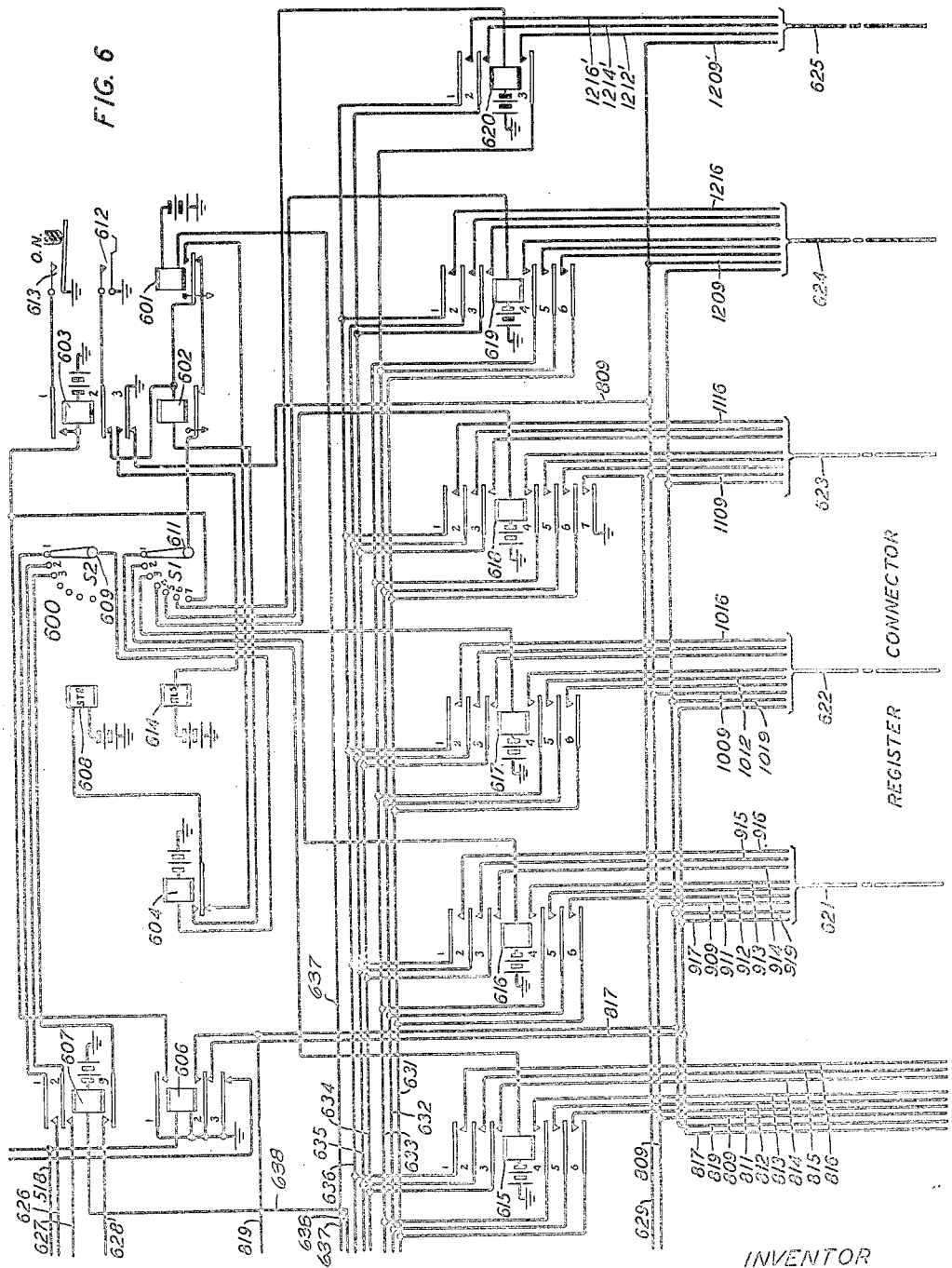

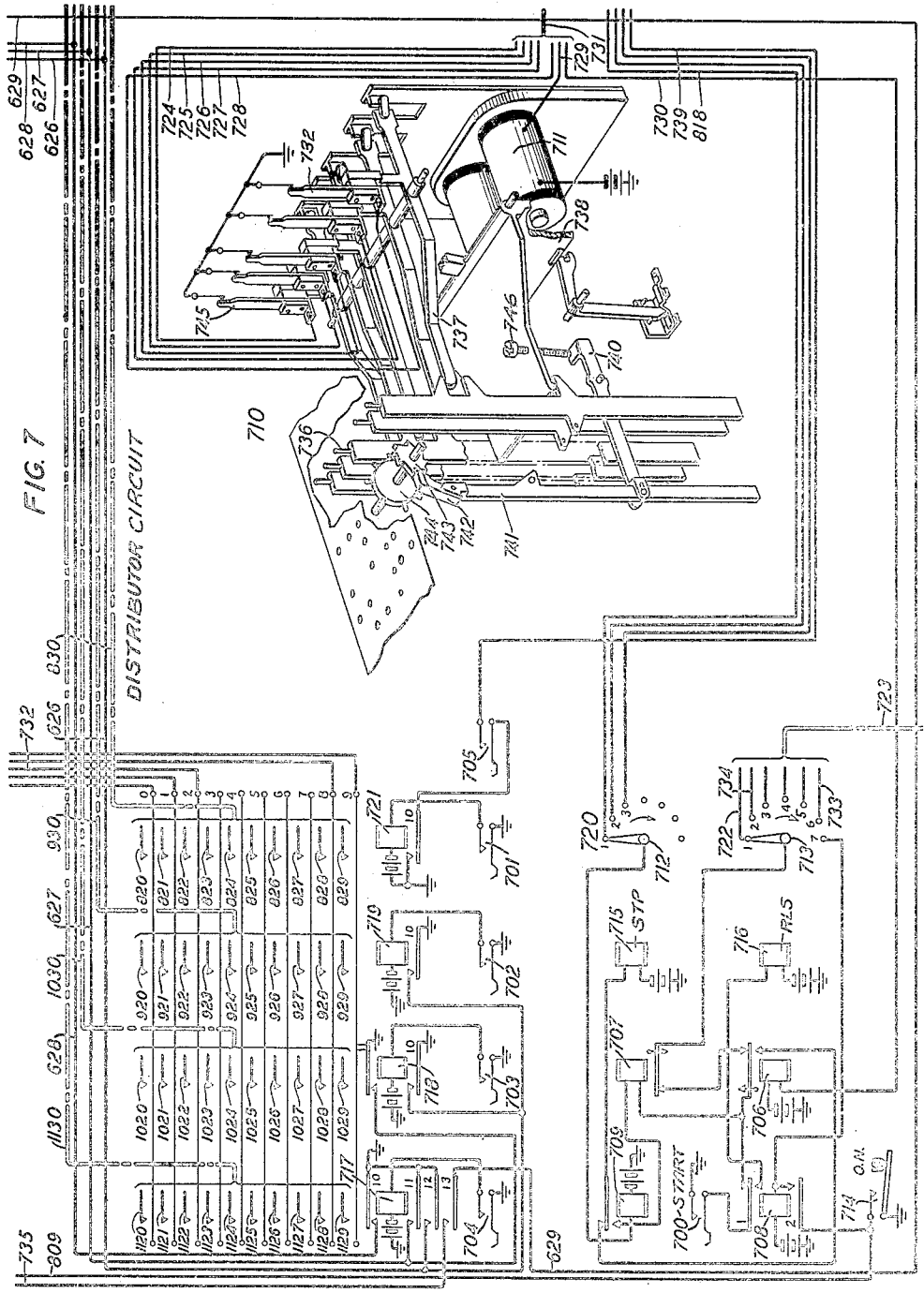

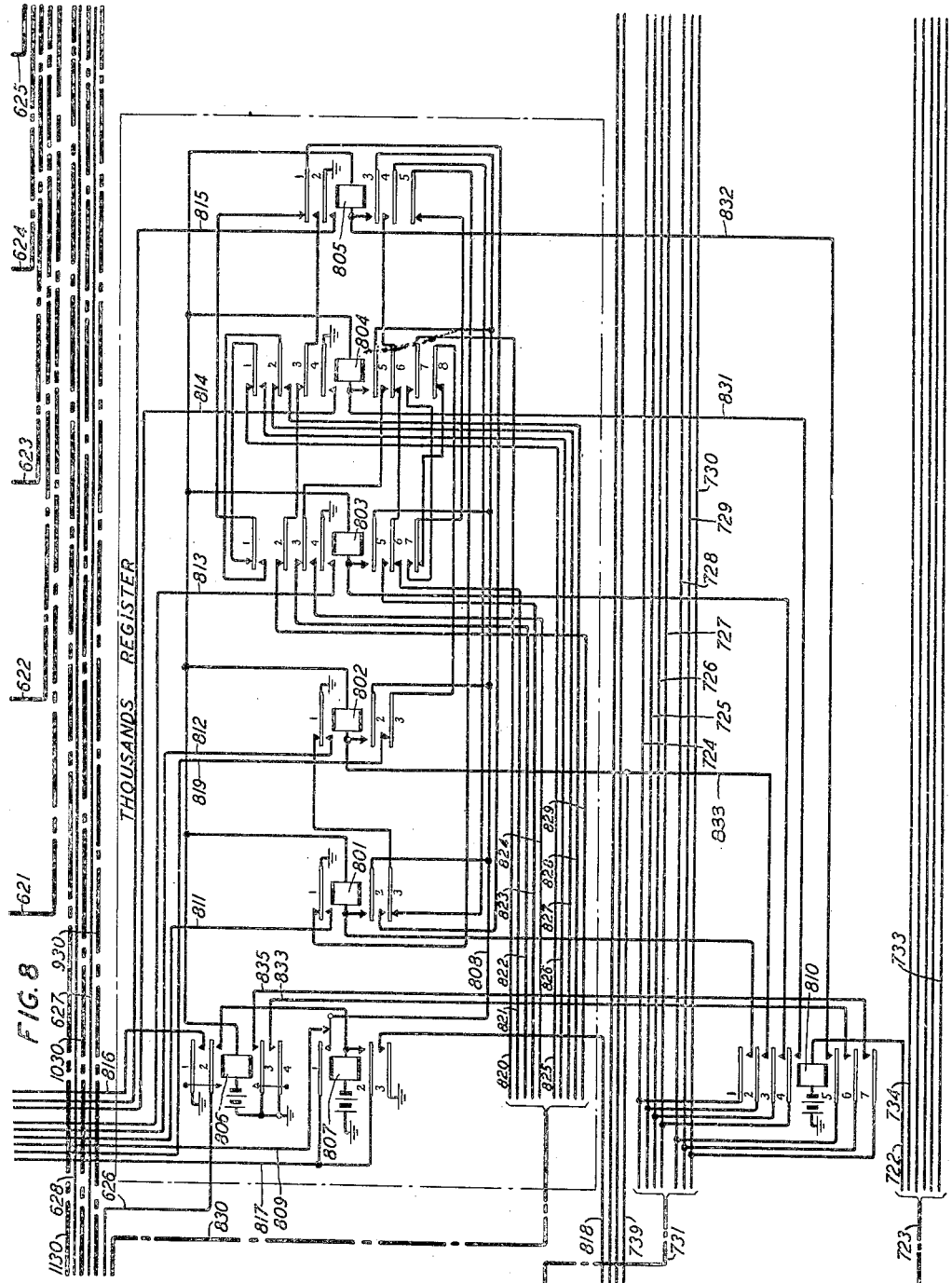

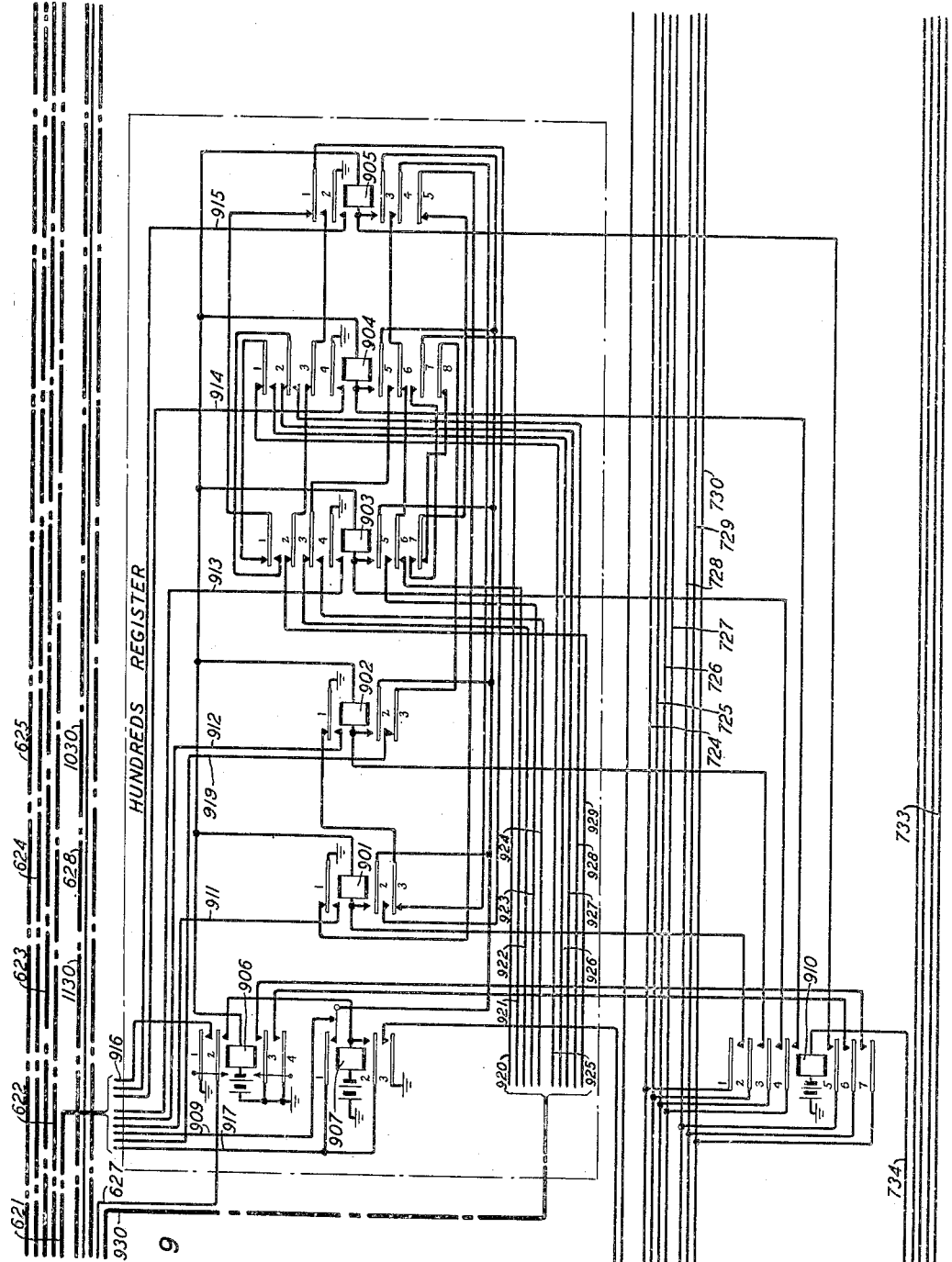

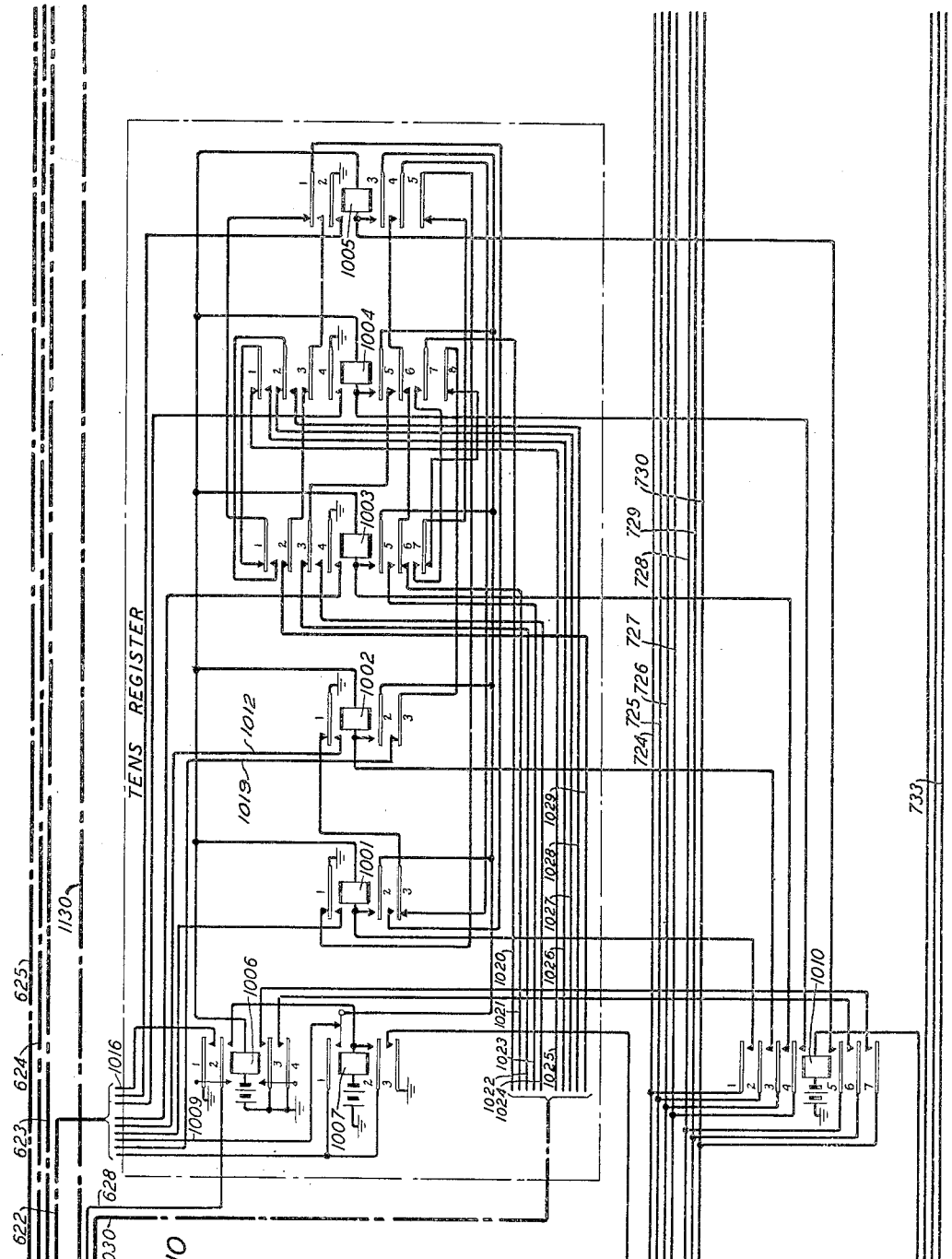

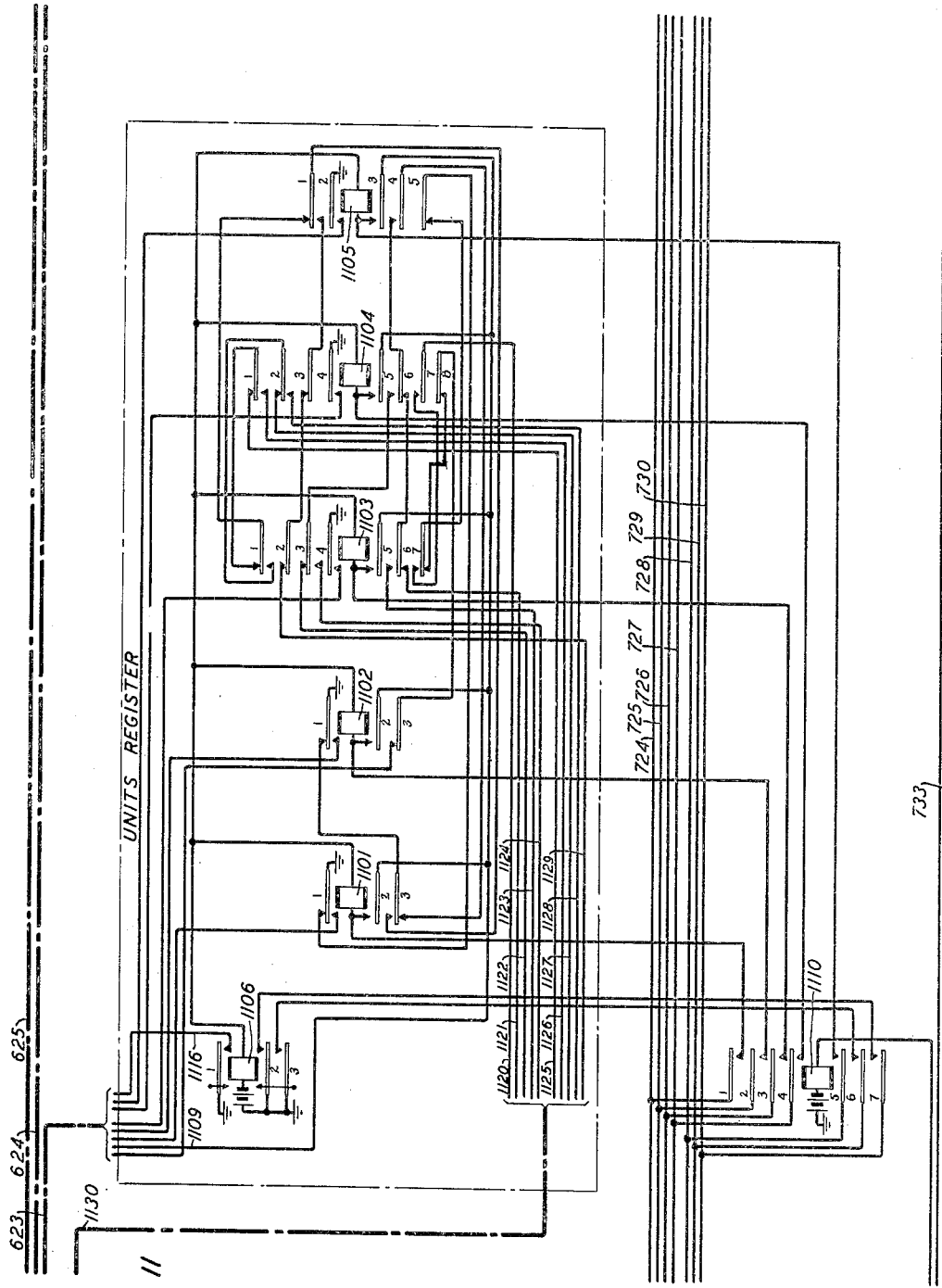

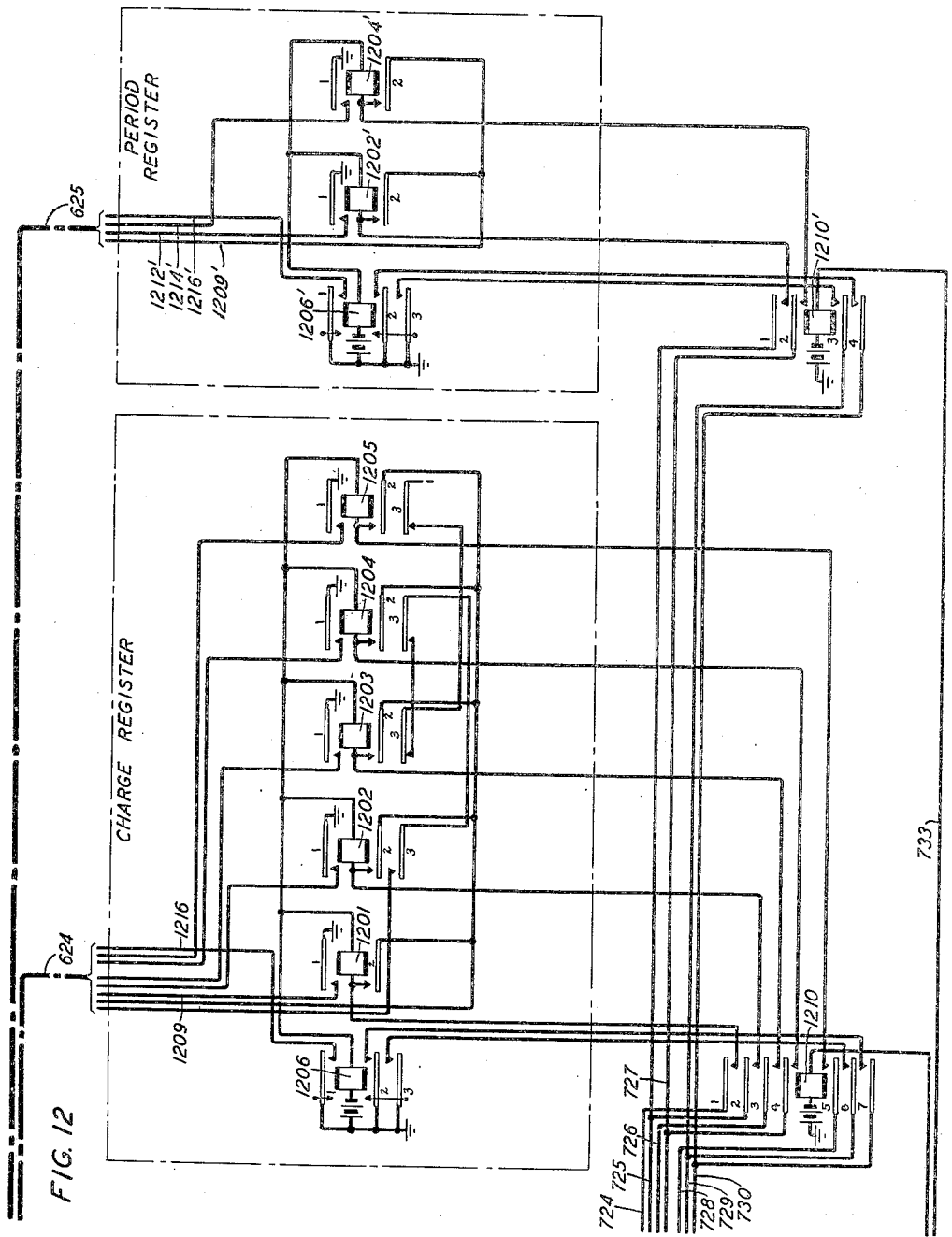

Oct. 16, 1945.  S. B. WILLIAMS  2,386,763
RECORD CONTROLLED SYSTEM
Filed Aug. 7, 1940  15 Sheets-Sheet 14

FIG. 17
A FINAL TAPE

FIG. 16
A TENS TAPE

```
07784.
----
17778.
11.
(LINE FEED)
27777.
49.
58.
(LINE FEED)
----
97744.
94.
46.
21.
(LINE FEED)
```

FIG. 14A
23537.7854.6971.4829

FIG. 15
A HUNDREDS TAPE

```
07784.
623.
498.
----127(LINE FEED)
17778.
455.
711.
259.
864.
----(LINE FEED)
27854.
777.
951.
----(LINE FEED)
667.
749.
758.
----(LINE FEED)
97744.
973.
794.
398.
746.
721.
398.
(LINE FEED)
```

FIG. 16A
07784.----(LF)17778.11.----(LF)27777. 49.58.

FIG. 14
THOUSANDS TAPE
(TEN OF THESE)

```
23537.
7854.
6971.
4829.
1127.
9023.
0066.
2895.
5112.
4857.
8021.
7777.
7951.
0939.
2487.
1069.
7667.
7749.
7758.
----
(LINE 1060. FEED)
```

FIG. 13A
23537.----429 32.----27834.

FIG. 13
OFFICE TAPE
(ONE OF THESE)
ALL NUMBERS WITH
THOUSANDS DIGITS
OTHER THAN 2 OMITTED

```
23537.
27854.
26971.
24829.
21127.
29023.
20066.
22895.
25112.
24857.
28021.
27677.
27951.
20939.
22487.
21069.
```

INVENTOR
S.B.WILLIAMS
BY
P.C. Smith
ATTORNEY

Oct. 16, 1945.  S. B. WILLIAMS  2,386,763
RECORD CONTROLLED SYSTEM
Filed Aug. 7, 1940  15 Sheets-Sheet 15

INVENTOR
S. B. WILLIAMS
BY P. C. Smith
ATTORNEY

Patented Oct. 16, 1945

2,386,763

UNITED STATES PATENT OFFICE 2,386,763

RECORD CONTROLLED SYSTEM

Samuel B. Williams, Brooklyn, N. Y., assignor to Bell Telephone Laboratories, Incorporated, New York, N. Y., a corporation of New York Application August 7, 1940, Serial No. 351,661

17 Claims. (Cl. 235—61.10)

The present invention relates to record controlled apparatus and particularly to distributing and computing equipment adapted to operate, automatically and in an appropriate order in response to a prepunched tape, one of a plurality of perforating devices for the production of other tapes on which are to be punched in numerical order certain items of information appearing in said prepunched tape, together with certain computed items relating thereto.

Specifically, the present invention is adapted to be operatively responsive to the punched tape prepared by the invention disclosed and claimed in my copending application, Serial No. 336,494, filed May 22, 1940. According to that invention, which relates to a telephone system including means adapted to produce a punched record of calls made from a plurality of telephone lines and in which the record contains the calling line numbers, the number of unit charges for each call made from each line and a period character which is used for switching purposes, the records for the individual lines are distributed non-consecutively throughout the tape with respect to the numerical designation of the lines but in the chronological order in which the several calls were made. The objective of the entire inventive idea comprehended by the means disclosed and claimed in the above-mentioned copending application and the means disclosed and claimed in the present application is the production of a punched record containing thereon in numerical order the line numbers from which the calls were made and the total of all unit charges adjacent each number which is assessable against the line designated by the number for the calls made therefrom and recorded on the original tape. The punched record prepared by means of the present invention may then be passed through any suitable record controlled printing device to produce a bill for each line.

According to the present invention, the original or office tape to which the equipment and circuits thereof respond comprises a punched tape or record containing information, in suitable code form, relating to telephone connections completed from the lines in the office, the information for each completed call consisting of the four digits of the calling line number, a digit which indicates the number of charge units to be assessed for the call, and a "period" following the charge digit to indicate the termination of the information for the particular call recorded. In the following description of the operation of the invention, reference to a line number as punched on the record will be made in terms of its thousands, hundreds, tens and units digit, the fifth digit which follows the units digit as the charge digit and the period which follows the fifth digit as the "period code."

The office tape is resolved by the equipment of the invention into a group of ten "thousands" tapes on which are collected all the line numbers having identical thousands digits together with their separate charges. Each of these tapes is then "analyzed" according to the hundreds digit and the ten hundreds tapes thus produced are subsequently analyzed again according to the tens digit wherein the line numbers having the same thousands, hundreds and tens digits are collected on one tape. These tens tapes are finally analyzed according to the units digit of each of the line numbers thereon and ten final tapes are produced on which the individual line numbers and the total charges for each of the lines are punched adjacent to each other. The final tapes thus emerging from these operations will have all the line numbers thereon arranged in numerical order, each followed by its own total number of charges, providing, of course, that the tens tapes are sorted in the correct numerical order. A punched tape of this kind may then be used to operate a suitable printer by means of which the line number and total charges therefor are printed on separately prepared bill-heads.

In order to carry out the foregoing operations to produce the intended result, there is provided a distributor circuit with a suitable tape transmitter as part thereof, a plurality of settable registers, ten perforating devices and associated computers, and suitable connectors by which the distributor circuit, any one of the perforators and any one of the registers may be operatively connected together.

In the drawings:

Figs. 3, 3A and 4 show the computer part of the perforator circuit;

Fig. 5 shows the perforator connector;

Fig. 6 shows the register connector;

Fig. 7 shows the distributor circuit;

Figure 1:
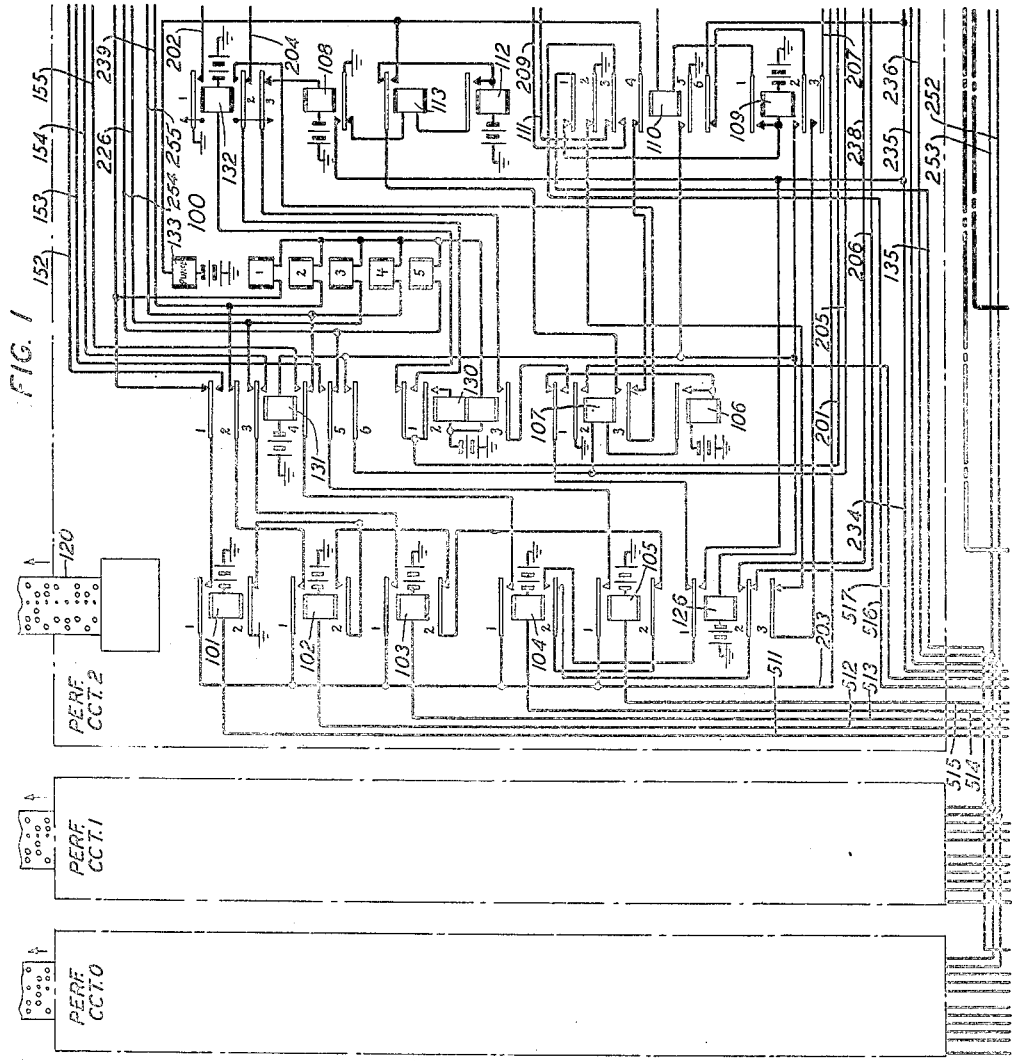
Figs. 1 and 2 show the perforator circuit.
Figure 2:
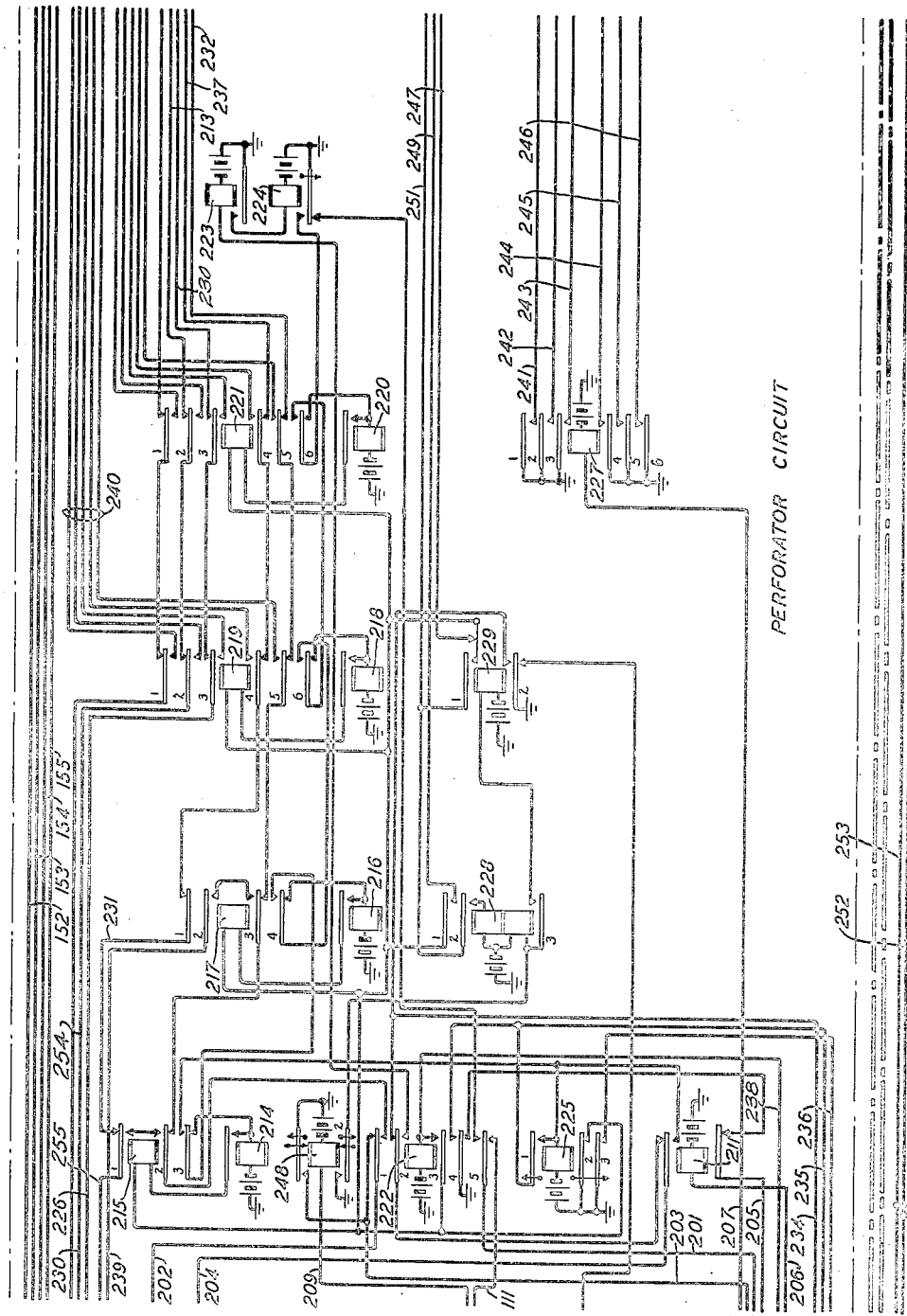
Figure 3A:
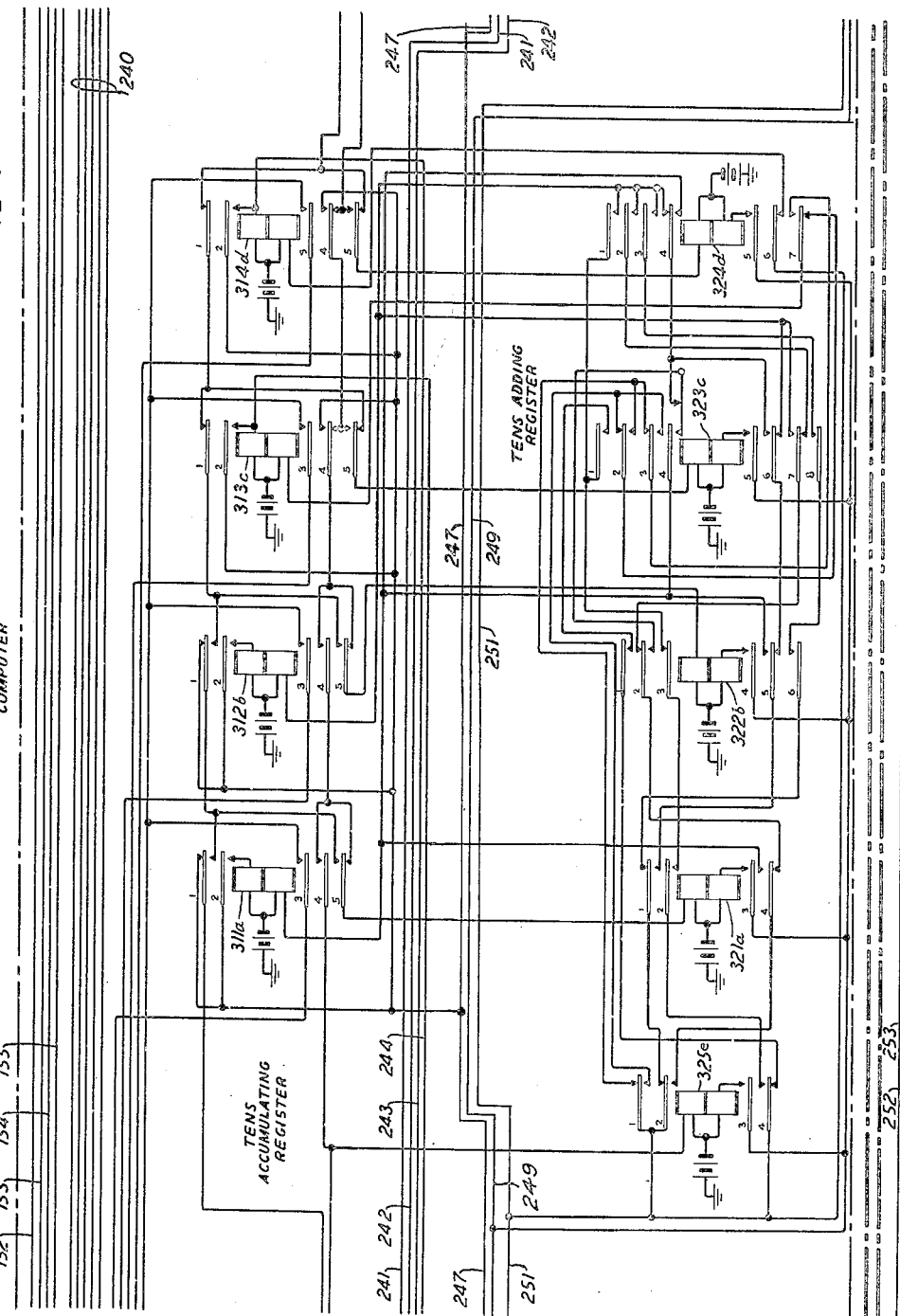
Figure 19A:
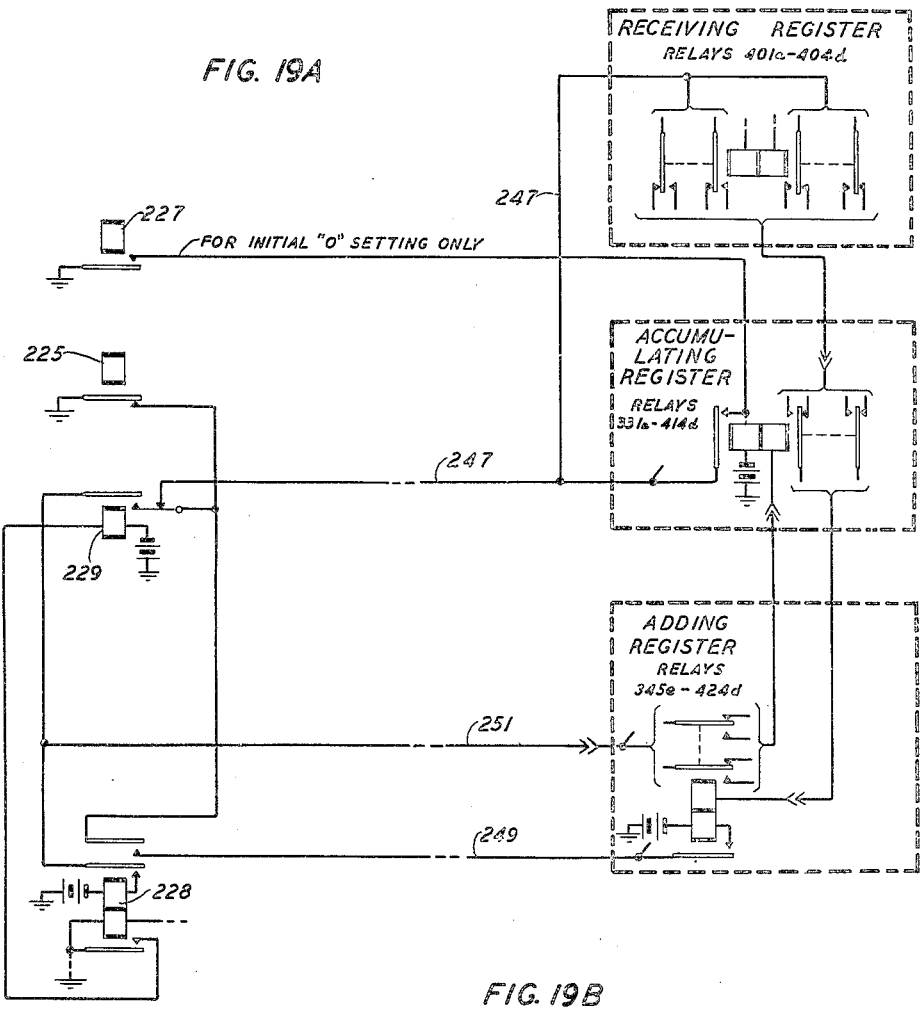
Figure 19B:
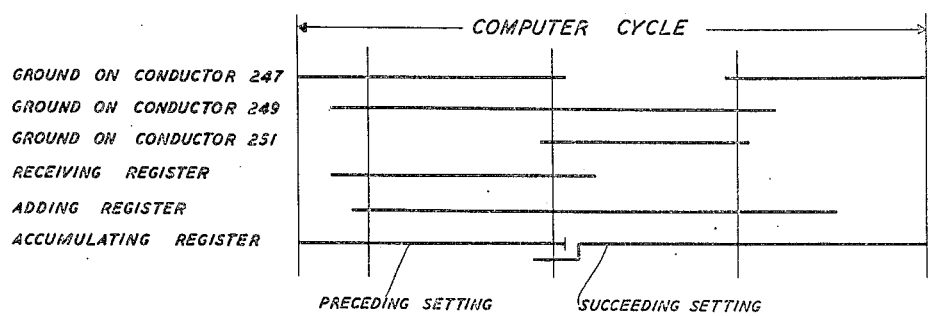

Figs. 8 to 12, inclusive, show the register circuits;

Figures 13, 13A, 14, 14A, 15, 15A, 16, 16A, 17, 17A:
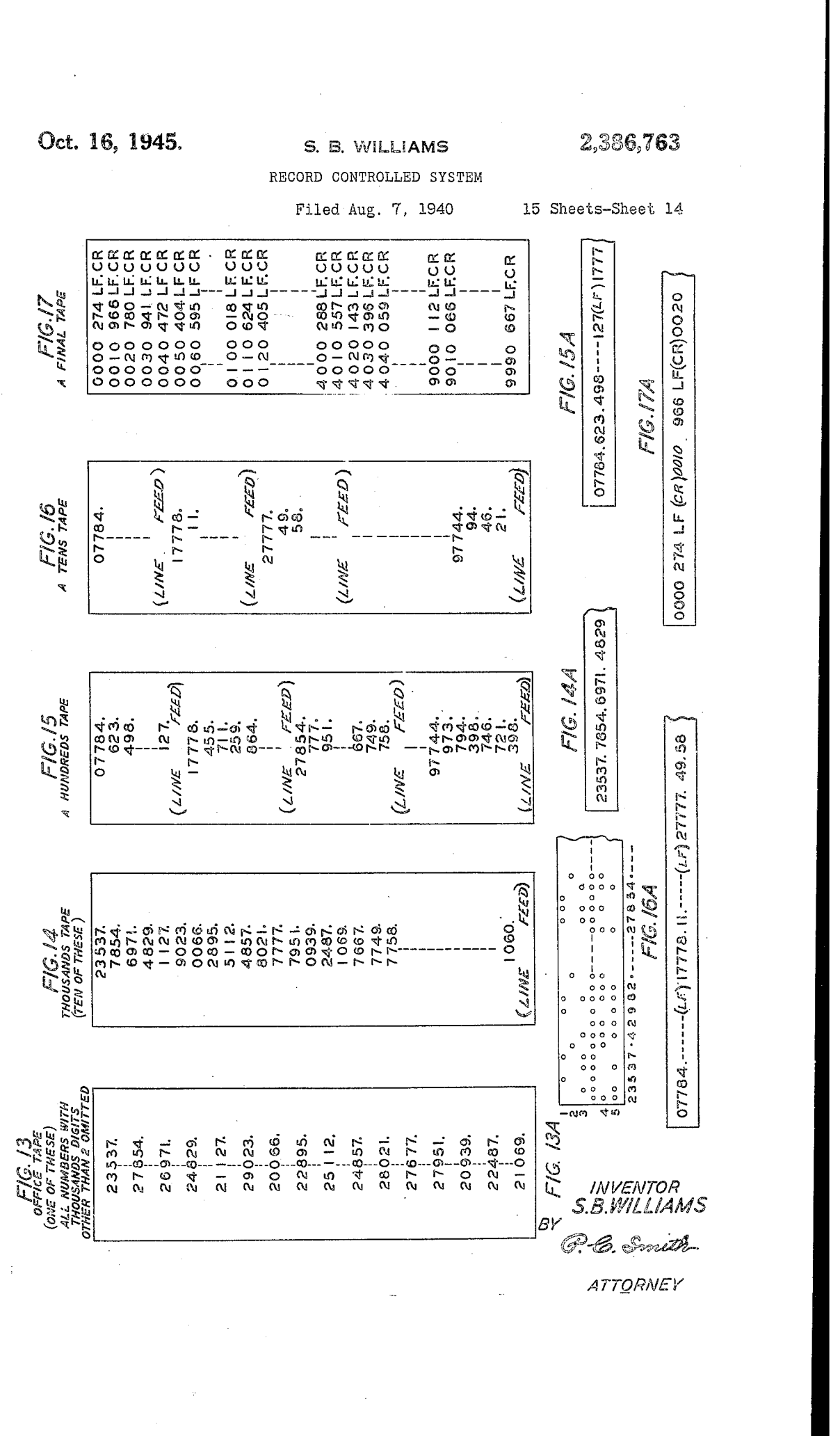

Fig. 13 shows a schematic form of the original or office tape;

Fig. 13A shows a physical representation of a portion of the punched tape schematically indicated in Fig. 13;

Figs. 14 to 17, inclusive, show schematic forms of the various tapes produced by the above apparatus including the final tape (Fig. 17);

Figs. 14A to 17A, inclusive, show schematically the actual longitudinal arrangement of the numbers which are shown transversely on the tapes of Figs. 14 to 17, inclusive and respectively; while Fig. 18 shows the manner in which Figs. 1 to 12, inclusive, should be arranged with respect to each other in order to disclose the invention completely; and Fig. 19A being a separate schematic indicating the accumulating, or adding, principle involved in the computer circuits shown in detail in Figs. 3, 3A and 4, while Fig. 19B is a sequence chart indicating the order of operation of certain registers of the computer during a complete cycle thereof.

Section I.—General Description

The distributor circuit comprises a magnet operated transmitter 710 through which the original tape is passed, a stepping switch 720 that serves to operate responsive means by which the distributor circuit may be connected to each of the registers in succession, a group of relays 717, 718, 719 and 721, by which selective conductors from each of the registers are used to operate an appropriate relay in the perforator connector by which the selected perforator circuit is connected to the register connector, and a group of keys 701-704, inclusive, by which each of the relays in the above group of relays may be operated in the order indicated by the sorting operations described hereinafter.

Each register circuit, as for example the thousands register shown in Fig. 8, comprises a group of register relays 801-805, inclusive, which responds to the thousands code of a line number on the office tape to store the digit designated by the code, a cut-in relay 810 by which the distributor circuit is connected to the register, and two other relays, namely, relays 806 and 807, the former of which locks in with the register and the latter operates only in the cases designated below when a particular digit registration is to be retained for a plurality of operations.

The perforator circuit (of which there are ten as indicated) comprises a perforator 100 of known construction such as, for example, the one shown in Patent 1,174,427, issued to C. L. and H. L. Krum on March 7, 1916, a group of register relays 101-105 which take from each of the registers the code of the digit or character to be punched on the tape controlled by the perforator 100, and a control circuit which not only guides the punching of the desired digits in the desired sequence but also controls the transmission back to the perforator, for punching purposes, of the number locked in the computer (Figs. 3, 3A and 4) representing the total charges for a line.

The computer part of the perforator comprises three registers: namely, a receiving register made up of relays 401a-404d (Fig. 4), an accumulating register divided into a units group of relays 411a-414d, a tens group of relays 311a-314d (Fig. 3A), and a hundreds group of relays 331a-334d (Fig. 3); and an adding register also divided into a units group of relays 421a-425e (Fig. 4), a tens group of relays 321a-325e (Fig. 3A), and a hundreds group of relays 341a-345e (Fig. 3). In the operation of the computer, the accumulating register is first set to zero and the first charge is received upon the receiving register. This charge, together with that registered in the accumulating register (which is zero upon the first charge in the receiving register) is then transferred to the adding register, after which the total charge on the adding registers is transferred to the accumulating registers. The adding registers are then restored to their unoperated condition. The second charge is received by the receiving register and added to the total on the accumulating registers to make a new total in the adding registers, which new total is then transferred to the accumulating registers and the adding registers are again returned to normal. These operations are repeated for each incoming charge and when all charges for a line are thus accumulated, the perforator 100 is operated to punch the total registered in the accumulating registers.

Before proceeding with a detailed description of the invention it is desirable to outline in advance the various steps in the operation thereof which are required to produce a punched tape of the type above indicated.

The various registers will take the thousands, hundreds, tens and units digits of the line number, the charge and the period from the office tape. The distributor circuit connects the registers to the proper one of the ten perforator circuits in accordance with the indicated value of the thousands digit. The perforator circuit thus selected in accordance with said digit punches the thousands number together with other information for the first charge recorded but for each call thereafter in the same thousands line group disregards the thousands digit and punches only the hundreds, tens and units digits of each of the line numbers in that group together with their respective charges and the period that follows each of said charges. A line feed code is punched at the end of the "thousands" tapes thus prepared.

Each of the "thousands tapes" is then run through the sensing mechanism of the distributor circuit and the register circuits take the record as they did from the original tape. The distributor circuit now connects the registers to the perforator circuit indicated by the hundreds digit of each of the line members. The perforator then punches, for the first line record, the entire line number with other information but for all the line members after the first disregards the thousands and hundreds digits and punches only the tens and units digits together with their separate charges and period. The line feed code is punched at the end of the "hundreds" tapes thus prepared.

Each "hundreds tape" is then run through the sensing mechanism and the register circuits take the record as they did from the thousands tape. The distributor circuit now connects the registers to the proper perforator circuit indicated by the tens digit of each of the line members. The perforator then punches, for the first line record, the entire number with other information but for all line numbers after the first disregards the thousands, hundreds and tens digit and punches only the units digit together with their separate charges and period. The line feed code is punched at the end of the "tens" tapes thus prepared.

The "tens" tapes produced as above each have the complete line number and charge therefor recorded for the first line appearing on the tape but only the units digits, the charge and the period for each of the lines that follow it, the line feed code which appears at the end of the tape being used to indicate the completion of the record. Each tens tape is run through the sensing mechanism and the register circuits take the record as they did from the hundreds tapes, but the distributor circuit now uses the units digit of each of the line members to selectively direct the record to the proper perforator circuit which, upon connection to the registers, operates to punch the complete line number as taken from the first tens tape record, the thousands, hundreds and tens digits being held in their registers. Thereafter the units digit is not punched, even though received. The computer portion of the perforator then takes the charges and accumulates them in the manner indicated above. When the carriage return code is received by the perforators, all of said perforator circuits proceed to punch the total charge accumulated in their associated computers, the line feed code and a "carriage return" code. This "units" tape may be held in the units perforator until all the tens tapes have been run through, thus providing ten final tapes which will have for each line number the total accumulated charge, line feed and carriage return codes.

Section II.—Distribution by Thousands

Proceeding, now, with the detailed description of the invention, it will be stated that the tape punched by the recording perforator circuit disclosed in the above-mentioned copending application contains the line numbers of the different calling lines of completed connections distributed non-consecutively along the tape and these must be brought together and all the charges for each of the lines must be accumulated to obtain the information for billing.

The distributor circuit is shown in Fig. 7. It has a magnet operated transmitter or sensing device 710 such as, for example, the telegraph transmitter of the type shown in Patent 1,298,440 granted to G. R. Benjamin on March 25, 1919 and, through this transmitter, the tape is passed. Six locking keys are provided as follows: one for each of the distributing operations, namely, the thousands key 701, hundreds key 702, tens key 703, units key 704, a start key 700 of the locking type and a locking key 705 for punching the line feed code on all the thousands tapes. The first operation is to distribute the line numbers on the original or office tape in accordance with the thousands digit of each of said numbers, the second by the hundreds, the third by the tens and the fourth and final operation by the units, the last mentioned distributing operation including the additional operation of accumulating the charges for each line and punching the total on the final tape adjacent to the line number.

Referring, now, to the detailed operation of the invention, the office tape is inserted into the transmitter feed and the thousands key 701 is depressed thereby causing the operation of relay 721 over an obvious circuit. Start key 700 is also operated. Switch 720 which is of the type shown in Patent 1,520,821 advances its brushes upon the operation of the motor magnet and restores them to their normal position by a motor spring when the release magnet is energized. When key 700 is operated, the switch is in its normal position so that its brushes 712 and 713 are engaged with their respective first terminals; that is, brush 713 is engaged to the terminal connected to the winding of relay 810 via conductor 722 included in the bracket line 723 so that the depression of key 700 completes a circuit extending from ground on the contacts of said key, No. 1 back contacts of relay 708, back contacts of slow-to-release relay 706, contacts of slow-to-release relay 707, brush 713 and terminal No. 1 engaged thereby, conductor 722, winding of relay 810 to battery. Relay 810 operates and, through its contacts, extends conductors 724-728, inclusive, to the thousands register relays shown in Fig. 8. By virtue of the sensing pins 736 that pass through those perforations in the office tape which comprise the thousands code of the digit of the first line number, the contact tongues, such as tongue 732, engage their respective grounded back stops and thus cause ground to be applied to one or more of the conductors 724-728. Thus, if the thousands digit is a 2, then the tape will be perforated in positions 4 and 5 according to the following code used in perforating the office tape by the apparatus disclosed in my above-mentioned copending application. In said code, the plus signs indicate perforations while the minus signs indicate no perforations.

*Perforator code*

|   | Number | | | | |
|---|---|---|---|---|---|
|   | 1 | 2 | 3 | 4 | 5 |
| 1 | − | − | − | − | + |
| 2 | − | − | − | + | + |
| 3 | − | − | + | − | + |
| 4 | − | − | + | + | + |
| 5 | + | − | − | − | − |
| 6 | + | − | − | + | − |
| 7 | + | − | + | − | − |
| 8 | + | − | + | + | − |
| 9 | + | − | − | − | + |
| 0 | − | − | + | + | − |
| Period | − | + | − | + | − |
| Carriage return | − | − | − | + | − |
| Line feed | − | + | − | − | − |

Accordingly when the sensing pins 736 pass through the holes in positions 4 and 5 of the tape, the bell crank lever 737 of each sensing pin passing through a perforation will lower its contact tongue 732 against a corresponding grounded back stop and ground one of the signaling conductors 724—728. Therefore, in such an eventuality for the code of the thousands digit 2, conductors 727 and 728 will be grounded and one circuit will be completed from ground on conductor 727, No. 4 contacts of relay 810, conductor 831, winding of relay 804, winding of slow-to-operate relay 806 to battery. Another circuit is completed from ground on conductor 728, No. 5 contacts of relay 810, conductor 832, winding of relay 805, winding of relay 806 to battery. Relays 804, 805 and 806 operate, the former two locking over their respective No. 5 and No. 3 contacts, conductor 808, normal No. 1 contacts of relay 807, conductor 809 to ground on the No. 3 back contacts of relay 603. Relay 806 operates and performs functions which will be described shortly.

The operated condition of relays 804 and 805 registers the thousands digit 2 in accordance with the above code. Relay 804 grounds conductor 814 over its No. 4 contacts and relay 805 grounds conductor 815 over its No. 2 contacts, while the closure of the No. 4 contacts of relay 806 completes a circuit for transmitter magnet 711 which extends over a path that traces from battery through the winding of the transmitter magnet 711, conductor 729 included within the bracket 731, No. 6 contacts of relay 810, conductor 833, to ground on the No. 4 contacts of relay 806. Magnet 711 operates, attracts its armature 738 thereby causing all the sensing fingers which are in an elevated position to be depressed, causes screw 746 to engage the approximate end of link 740 thereby raising the slide rod 741 and causing pawl 742 to advance the ratchet wheel 743 through the space of one tooth, thus rotating sprocket wheel 744 through the space of one tooth to cause the tape to be advanced to the next transverse set of perforations. Inasmuch as relay 806 is slow to operate, sufficient time is allowed for operating relays 804 and 805 before operating ground is removed from conductors 727 and 728 consequent to the operation of the transmitter magnet 711.

Upon the operation of relay 806 a circuit is closed for relay 706 which traces from ground on the No. 3 contacts of relay 806, conductor 835, No. 7 contacts of relay 810, conductor 730 included within the bracket line 731, winding of relay 706 to battery. Relay 706 operates, opens the circuit of the thousands cut-in relay 810 which releases to disconnect the transmitter leads 724—730 from the thousands register, including the circuit of relay 706 which, however, being slow-release, releases after an interval and including, also, the circuit of transmitter magnet 711 which releases to raise the sensing pins 736 through the holes on the tape aligned thereover. Relay 706, when operated, further closes the circuit of the stepping magnet 715 of switch 720 over a path which is traced from ground on the contacts of key 700, No. 1 back contacts of relay 708, front contacts of relay 706, back contacts of relay 709, winding of magnet 715 to battery. Magnet 715 operates, closes off-normal contacts 714 of the switch 720, applies supplementary ground through said contacts to conductor 809, and steps the brushes 712 and 713 to their next respective terminals where brush 713 completes the circuit over conductor 734 through the winding of the cut-in relay 910 of the hundreds register. Relay 706 is made slow-to-release in order to make certain that it will not reclose its back contact before the brushes of switch 720 have stepped and thereby falsely reoperate relay 810.

The operation of relays 804 and 805 (for the assumed thousands digit 2) causes ground to be applied to conductor 822 over the following path: ground on the No. 1 back contacts of relay 802, No. 3 back contacts of relay 801, No. 4 contacts of relay 805, No. 6 front contacts of relay 804, No. 3 back contacts of relay 803 to conductor 822, which, within bracket line 830, further extends over the No. 2 contacts of relay 721, conductor 732, winding of relay 502 to battery. Relay 502 operates, connects the perforator circuit No. 2 disclosed in Figs. 1, 2, 3, 3a and 4 to the distributor circuit and locks to ground on conductor 809 via its No. 9 contacts. Thus, depending upon the digital value of the thousands digit, the correspondingly numbered perforating circuit is connected to the distributor circuit through the appropriate one of the ten cut-in relays 500–509 (relays 503–507, inclusive, not being shown) there being ten perforating circuits of which the second, or No. 2, is fully disclosed for describing the operation of the invention, while the remaining nine perforator circuits are only schematically indicated in Figs. 1 and 4.

Each perforator circuit has its own cut-in relay for connection with the distributor circuit, the cut-in relay operated depending upon the digital value of the thousands digit. Relays 801–805 are operated in the appropriate combination called for by the thousands digit code punched on the tape for applying ground to one of the conductors 820–829, depending upon the value of the thousands digit, in order that a circuit may be completed to the winding of the cut-in relay called for by the thousands digit to connect the correspondingly numbered perforator to the distributor circuit. The relation between the perforator circuits, their respective cut-in relays 500–509 and the conductor grounded for each of them in accordance with the value of the thousands digit is shown in the following table:

| Thousands digit | Conductor grounded | Relay operated | Perforator circuit connected |
|---|---|---|---|
| 0 | 820 | 500 | 0 |
| 1 | 821 | 501 | 1 |
| 2 | 822 | 502 | 2 |
| 3 | 823 | 503 | 3 |
| 4 | 824 | 504 | 4 |
| 5 | 825 | 505 | 5 |
| 6 | 826 | 506 | 6 |
| 7 | 827 | 507 | 7 |
| 8 | 828 | 508 | 8 |
| 9 | 829 | 509 | 9 |

As soon as the thousands digit 2, for example, is registered in the thousands register and perforator circuit No. 2 is connected to the distributor circuit through the operation of relay 502, conductors 811–816 from said register are extended to said perforator circuit through the contacts of relays 615 and 502, the former relay having operated over a circuit shortly to be described.

In order to connect the various registers to the perforators, locking key 612 is operated, whereupon a circuit is completed for relay 615 which extends from ground on said key, No. 2 contacts of relay 603, back contacts of relay 601, contacts of slow-release relay 602, brush 611 of switch 600 and first terminal engaged thereby (said switch being of the same construction as switch 720), winding of relay 615 to battery. Upon the operation of this relay, therefore, conductors 811–816 are joined to conductors 631–636, respectively, and the latter are joined to conductors 511–516, respectively, through relay 502 which is operated. Conductors 814 and 815, however, are grounded by relays 804 and 805, respectively, so that conductors 634 and 635 are likewise grounded through the Nos. 3 and 2 contacts, respectively, of relay 615, and conductors 514 and 515 have ground applied to them through the Nos. 5 and 4 contacts, respectively, of relay 502. Inasmuch as relay 104 of the selected perforator circuit No. 2 is connected to conductor 514 and relay 105 of said perforator circuit is connected to conductor 515, circuits are completed for these relays which thereupon operate. It will be observed that ground is also applied to conductor 816 via the No. 1 contacts of relay 806 in the thousands register which, over the No. 1 contacts of relay 615, extends to conductor 636, and through the No. 3 contacts of relay 502 to conductor 516, thence over the No. 3 back contacts of relay 110, conductor 111, No. 5 back contacts of relay 222, conductor 201, No. 1 back contacts of relay 130, winding of relay 132 to battery. Relay 132 operates and applies ground through its No. 1 contacts, conductor 202, No. 1 back contacts of relay 222, conductor 203, to the No. 1 armatures of relays 101–105. The operated relays in this group, namely, relays 104 and 105 for the thousands digit 2, will cause the ground on the No. 1 contacts of relay 104 to be applied over the No. 4 back contacts of relay 131 to the winding of punch-set magnet 4 of perforator 100 which is of known construction. The ground on the No. 1 contacts of relay 105 is applied over the No. 5 back contacts of relay 131 to the winding of punch-set magnet 5. Inasmuch as the other side of the winding of each of the code magnets 1–5 of the perforator 100 is connected to battery through the lower winding of relay 130, circuits are completed for punch-set magnets 4 and 5 and relay 130, the magnets operating to set the punch bars to punch the code of the digit 2, and the relay operating over its lower winding and then locking over its upper winding and No. 2 contacts to ground on the No. 1 contacts of relay 806 as previously traced thereto via conductors 201, 111, 516, 636 and 816. This ground is now further applied over the No. 1 front contacts of relay 130, No. 2 front contacts of relay 132, No. 3 back contacts of relay 107, No. 4 contacts of relay 110, winding of punch magnet 133 to battery. The magnet operates and causes the tape to be perforated in punch positions 4 and 5 to designate the thousands digit of the calling number.

When relay 130 operates, relay 132 releases after an interval, thus allowing sufficient time to operate punch magnet 133 as above described. Ground on the No. 1 front contacts of relay 130 is then applied over the No. 2 back contacts of relay 132, conductor 204, back contacts of relay 211, No. 2 back contacts of relay 222, conductor 234, No. 1 contacts of relay 502, conductor 637, winding of slow-to-release relay 601 to battery. Relay 601 operates, opens the circuit of relay 615 which thereby releases, disconnects the perforator circuit from the thousands register circuit, and closes the circuit of the stepping magnet 608 of switch 609 over a path traced from battery through the winding of said magnet, back contacts of relay 604, front contacts of relay 601, No. 2 contacts of relay 603 to ground on the contacts of key 612. The magnet operates and steps the switch brushes 609 and 611 to their next respective terminals whereupon brush 611 completes the circuit through the winding of relay 615.

The release of relay 615 further causes ground to be disconnected from conductors 516, 201 and 111, thereby causing the release of relay 130 in consequence of which ground is disconnected from conductors 234 and 637 thereby causing the release of relay 601 which, in turn, opens the circuit of magnet 608. Also, the opening of the Nos. 4 and 5 contact sets on relay 615 causes the release of relays 104 and 105, thereby restoring the perforator register relays to normal in readiness to receive the hundreds digit. It will be observed, however, that, although the thousands register has been disconnected from the perforator, relays 804 and 805 of said register remain energized through their respective locking circuits to ground on the No. 3 contacts of relay 603 via conductor 899. As will be shown below, the operated register relays of the thousands register as well as the operated register relays of the other registers, will be released after the perforator has punched the period code of a line charge record.

As the tape is fed successively after each registration through the transmitter 710, the operations above described are repeated with the hundreds, tens and units digit code designations, the number of messages to be charged and the period code of the calling number. As the hundreds, tens, units, charge and period registers are successively switched in and out of connection with the distributor circuit through their respective cut-in relays 910, 1010, 1110, 1210 and 1210', perforator circuit No. 2 causes the tape 120 to be punched transversely and in succession with a number of punches in each transverse column to designate the code of the digit registered in the corresponding digit registers, which registration was derived, in turn, from the perforations on the office tape as each transverse column thereon passed through the transmitter 710 and caused the grounding of the appropriate combination of conductors in the group 724–728 as before described. The register relays and the wiring of these relays in the hundreds, tens, units, charge and period registers are, therefore, the same as those of the thousands register, the operation of the register relays in each of these registers is the same as that of the thousands register and, therefore, the description of said operations is not repeated. The designations of the various relays and conductors in each of the hundreds, tens, units, charge and period registers are made the same as those of the corresponding relays and conductors of the thousands register so that the circuit operations corresponding to those so far described for said last-mentioned register may, if desired, be easily followed in each of the other registers. Each registration, upon becoming locked in the appropriate register, remains locked therein under the control of ground on the No. 3 contacts of relay 603 applied to conductor 899 and the connecting conductors 909, 1009, 1109, 1209 and 1209' notwithstanding the release of the appropriate digit register from the perforator circuit after the punching operations following each registration as above described. The register relays themselves, however, are unlocked only when relay 603 operates, as hereinafter described.

When the brushes 712 and 713 of switch 720 have been advanced to the No. 6 terminal set at which time brush 713 engages conductor 733, that is, when preparing to register the period code, a circuit is completed for relay 1210' similar to that for relay 810, previously described, which extends from ground on the contacts of start key 700, thence as previously traced to brush 713 and the No. 6 terminal engaged thereby, conductor 733 within bracket line 723, winding of relay 1210' to battery. Relay 1210' operates and extends the transmitter conductors 725 and 727 over its No. 1 and No. 2 contact sets to the windings respectively of relays 1202' and 1204' and the switching conductors 729 and 730 over its No. 3 and No. 4 contact sets to the No. 2 and No. 3 contact sets, respectively, of relay 1206'. Now since the "period" code requires a perforation in the second and fourth positions of the office tape, then, when said tape is in the position in which the perforations of said code are aligned over sensing fingers 736 of said two respective positions, conductors 725 and 727 become grounded thereby and complete easily traced circuits to relays 1202' and 1204'. Inasmuch as the winding of relay 1206' is connected in series with the windings of said register relays, relay 1206' also operates when the circuits of relays 1202' and 1204' are completed. By the time relay 1206' operates, relay 620 will have been operated since brush 611 will have been advanced in the manner shown to the No. 6 terminal connecting with the winding of said relay as a consequence of the successive punching of the line digits and the charge units on tape 120 as previously explained. With relays 620 and 1206' operated, ground is applied to conductor 1216' through the No. 1 contacts of relay 1206' to conductor 636 via the No. 1 contacts of relay 620 and to conductor 516 via the No. 3 contacts of relay 502, wherefrom a previously traced circuit is completed to relay 132 which, in operating, results in the operation of punch-set magnets 2 and 4 of the perforator 100 consequent to the operation of relays 102 and 104 over easily traced circuits to the No. 1 contacts of relays 1202' and 1204' respectively. The code of the period is now punched on tape 120 as before described for the punching of the code of the thousands digit 2.

During the time that relays 102 and 104 are operated, a circuit is completed for relay 106 which extends from battery through the winding of said relay, No. 1 back contacts of relay 107, No. 1 back contacts of relay 126, No. 2 front contacts of relay 104, No. 2 contacts of relay 105, No. 2 contacts of relay 103, No. 2 contacts of relay 102, No. 2 contacts of relay 101 to ground. Relay 106 operates and applies operating ground over its contacts to one side of the winding of relay 107, the other side of which is grounded through the No. 4 back contacts of relay 222, lower contacts of relay 211 to conductor 205. Now when the complete record of the call is punched, as evidenced by the punching of the code of the period character and the removal of ground from the No. 1 contacts of relay 106 consequent to the release of relays 102 and 104, relay 107 operates and locks in series with relay 106 to ground on the No. 4 back contacts of relay 222. These relays now remain locked to the No. 4 back contacts of relay 222 until relay 211 operates on the registration of the line feed code by relays 101-105 of the perforator circuit after a tape has been completely analyzed as subsequently set forth and also when relay 222 operates after charge accumulations, also as subsequently set forth.

Subsequent to the punching of the period code, brush 611 of switch 600 is advanced to the last or terminal No. 7 of its arc and a circuit is then completely for relay 603 which extends from battery through its winding, terminal No. 7 and brush 611, contacts of relay 602 and back contacts of relay 601, No. 2 contacts of relay 603 to ground on the key 612. Relay 603 operates, closes its No. 1 contacts before breaking its No. 2 contacts to insure locking to ground thereover on the off-normal springs 613 of switch 600, said springs having been closed as soon as the switch stepped off normal, removes ground from conductor 809, thereby causing the release of all register relays locked thereto, if, in the meanwhile, switch 720 has also been restored to normal (as will be shown) and its off-normal springs 714 opened and removed ground from this conductor, and closes an obvious circuit for the release magnet 614 which operates to restore the brushes 609 and 611 into engagement with their respective first terminals in which brush 611 re-establishes the path to the winding of relay 615.

The grounding of conductor 729 by the operation of relay 1206' results, of course, in the operation of transmitter magnet 711 to advance the office tape, and the grounding of conductor 730 by said relay results in the operation of relay 706 which functions to advance the brushes 712 and 713 of switch 720 to terminal No. 7 of their respective arcs. Upon the release of relay 706 in consequence of the release of relay 1210' and the removal of ground from conductor 730, a circuit path is completed for relay 708 extending from ground on key 700, No. 1 back contacts of relay 708, back contacts of relay 706, contacts of relay 707, brush 713 and terminal No. 7 of its arc, winding of relay 708 to battery. Relay 708 operates, makes its No. 2 contacts before breaking its No. 1 back contacts thereby locking to ground on off-normal springs 714 and to ground on conductor 809 applied thereto over the No. 3 back contacts of relay 603, and completes a circuit for release magnet 716 of switch 720 extending from ground on the contacts of key 700, No. 1 front contacts of relay 708, winding of release magnet 716 to battery. The magnet operates, causes brushes 712 and 713 to be returned to their respective No. 1 terminals and further causes off-normal springs 714 to be opened, thereby removing ground from conductor 809 and causing the release of all register relays, relay 502 and relay 708 if ground is also removed from said conductor by the operation of relay 603 after the punching of the period code as above described. In the event that relay 603 has not operated to remove ground from conductor 809 by the time brushes 712 and 713 are returned into engagement with their respective first terminals, relay 708 is held locked over its No. 2 contacts to ground on said conductor, and because its No. 1 back contacts are opened, it keeps open the circuit of cut-in relay 810 of the thousands register, thereby preventing the connection of the distributor with the register. When ground is removed from conductor 809 by the operation of relay 603, a positive signal is furnished that the previous line number, including the period code thereof, has been recorded on the tape and that the registers are cleared of this registration by the unlocking of the relays therein. The reconnection of the distributor with the thousands register may, and now does, take place by the closure of the previously described circuit for relay 810 over the back contacts of relay 708, the latter relay releasing upon the removal of ground from conductor 809.

The period code is the code that completes the information record of one call, the same consisting of the code of the calling line number, that of the number of charges and that of the period itself. Hence when the office tape advances through the transmitter 710 to the place where the sensing fingers 736 engage the perforations of the thousands code of the next line number, relay 721 will still be operated in the distributor circuit and relays 106 and 107 will still be locked up in the perforator circuit last used, which is perforator circuit No. 2 corresponding to the assumed thousands digit 2 of the first line number whose call information record perforations have just been produced on tape 120.

The code of the thousands digit of the next line number will cause operations identical to those described above with respect to any other of the ten perforator circuits to which the distributor circuit has access through relays 500-509. Thus it has been assumed that the thousands diigt of the first line number on the office tape was a 2 and that, therefore, perforator circuit No. 2 was selected, whereupon the tape 120 controlled by it was perforated with codes of the entire line number, the charge and the period. The same thing will be true of the other nine perforator circuits when seized in response to a corresponding thousands digit of a succeeding line number being registered in the thousands register.

After the first line record has been perforated on tape 120 of perforator circuit No. 2, succeeding line records having 2 for a thousands digit will, of course, be perforated on the same tape 120, but in the case of these line records, only the hundreds, tens, units, charge and period codes of said records will be punched on the tape and not the thousands digit which will be disregarded by the selected perforator circuit No. 2. In other words if, say, the first line record on the tape 120 controlled by perforator circuit No. 2 happens to be 23537., and the next line number on the office tape in the second thousands group happens to be 27854., only 7854. will be punched on tape 120, the thousands digit 2 being disregarded by the perforator. The same thing will be true of all other line numbers punched by the other nine perforators; that is, the first number in the thousands group that calls for the correspondingly numbered perforator circuit will be punched in its entirety but all other line numbers belonging to the same thousands group and following the first number will have their thousands digit (which is the same for all other line numbers in the group) omitted.

To describe the further operation of the invention suppose therefore that, in the preparation of the ten "thousands" tapes from the office tape, a line number is encountered subsequent to the perforation of a line number with a thousands digit 2, of another number also having the thousands digit 2. Relay 806 operates as before and the grounding of conductors 727 and 728 in response to the code of the thousands digit 2 causes, therefore, the operation of relays 804 and 805 in the thousands register which, in turn, cause the application of ground to conductor 732 to cause the operation of relay 502 as before described in order to reconnect perforator circuit No. 2 to the distributor circuit. In this perforator circuit, it will be recalled, relays 106 and 107 are locked. As a result of locked up condition of these relays, a circuit is completed for relay 607 which extends from battery through the winding of said relay, conductor 638, No. 2 contacts of relay 502, conductor 517, No. 2 contacts of relay 107 to ground. Relay 607 operates but performs no function at this time relative to the preparation of the thousands tape.

Since the thousands digit 2 has resulted in the operation of relays 804 and 805 which lock in series with relay 806, ground on conductors 814 and 815 causes the operation of relays 104 and 105 in the perforator circuit as before described. And the ground on conductors 816, 636 and 516 (serially) results in the operation of relay 132, also as before described, which in turn applies ground through its No. 1 contacts to the No. 1 armatures of relays 104 and 105, also as before described. These relays being operated, previously described circuits for punch-set magnets 4 and 5 in series with the lower winding of relay 130 are closed resulting in the operation of said magnets and said relay 130 which latter, in operating, opens the circuit of relay 132. Relay 132 is slow to release but the previously described circuit for the punch magnet 133 through the No. 2 front contacts of relay 132 is now cut off at the No. 3 back contacts of relay 107 so that, although the punch-set magnets 4 and 5 are operated in preparation to perforate tape 120 to record the thousands digit 2, yet the record is not perforated due to the opening of the circuit for punch magnet 133 by the operation of relay 107 after the punching of the period code for the first line record to be punched on the tape 120. Instead, a circuit is closed for relay 112 which extends from battery through the winding of said relay, back contacts of relay 113, No. 3 front contacts of relay 107, No. 2 front contacts of relay 132, No. 1 front contacts of relay 130 to ground on conductor 201 as previously traced thereto. Relay 112 operates and applies operating ground through its contacts to one side of the winding of relay 113, the other side of the winding of said relay being grounded by the back contacts of relay 108 and, therefore, causing said relay 113 to remain short-circuited. When relay 132 releases after an interval, punch-set magnets 4 and 5 are released and the short circuit around relay 113 is removed, thereby causing said relay to operate in series with relay 112 to ground on the back contacts of relay 108. Relay 132, in its released condition, also applies ground over its No. 2 back contacts to conductor 234 via conductor 204, back contacts of relay 211, No. 2 back contacts of relay 222, and completes a previously traced circuit for relay 601 which, upon operating, completes the circuit for stepping magnet 608 of switch 600. Said magnet, in operating, causes switch brushes 609 and 611 to be advanced to their respective second terminals, thereby causing the release of relay 615 and the disconnection of the thousands register from the perforator circuit.

Thus when a given perforator circuit, which has once been taken into use to cause the perforation of a line number whose thousands digit corresponds to the number of the perforator circuit, is again taken into use for perforating the record of another line number with the same thousands digit as the designated number of the perforator circuit, the thousands digit of the second and succeeding line numbers are not perforated on the tape.

Since relay 806 is operated in series with the locked register relays 804 and 805, ground on conductor 833 will have completed a previously traced circuit for transmitter magnet 711 which operates to advance the office tape to the code of the hundreds digit, while ground on conductor 835 will have closed a previously traced circuit for relay 706 which operates to cause the advance of brushes 712 and 713 to their respective second terminals, thereby connecting brush 713 with the winding of relay 910 which connects the distributor circuit with the hundreds register, the perforator circuit No. 2 having been connected to said register as a result of the operation of relay 616 following the advance of brush 611 of switch 600 to terminal No. 2 of its arc and the release of relay 601 following the removal of ground from conductor 234 as a result of the release of relay 130.

The perforation of the code of each of the remaining digits and that of the period of the second line number now proceeds in the manner already described for the perforation of the first line number except for the fact that, due to the operated condition of relays 106 and 107 and 112 and 113, the operating circuit for the punch magnet 133 is now traced from battery through the winding of said magnet, front contacts of relay 113, No. 3 front contacts of relay 107, No. 2 front contacts of relay 132, No. 1 front contacts of relay 130 to ground as previously traced. However, upon the release of relay 132 subsequent to the punching of the period code of the second line record and during the time that relays 102 and 104 are still operated, a circuit is completed for relay 108 which extends from battery through the winding of said relay, No. 3 back contacts of relay 132, No. 3 contacts of relay 130, No. 1 front contacts of relay 107, No. 1 back contacts of relay 126, No. 2 front contacts of relay 104, No. 2 contacts of relay 105, No. 2 contacts of relay 103, No. 2 contacts of relay 102, No. 2 contacts of relay 101 to ground. Relay 108 operates and unlocks relays 112 and 113 which release and (with relays 106 and 107 still locked) restore the operating circuit for relay 112 so that, for the punching operations of the next line record to be disposed of by the same perforator, the registration of the thousands digit 2 on relays 104 and 105 will cause the operation of relay 112 instead of punch magnet 133, thereby avoiding the punching of the thousands digit on the tape 120. When relays 102 and 104 release upon the release of relay 620, relay 108 restores and again applies ground to one side of the winding of relay 113. Thus, following the punching of the period code of each line record in each of the perforators, relays 112 and 113 are released and reoperated upon the digit to be skipped in the punching of the subsequent line record.

The appearance of any one of the thousands tapes as produced from the office tape by any one of the correspondingly numbered perforators will be somewhat like the one illustrated schematically in Fig. 14 which shows the tape for the second thousands line group derived from the office tape shown in Fig. 13 which, in turn, shows only that portion of the office tape record that includes line records having a 2 for their thousands digit, the line records with thousands digits other than 2 having been omitted for the sake of clearness and brevity. On the tape shown in Fig. 14 it will be observed that the entire first line number, including the thousands digit, is punched thereon and that all other succeeding line numbers belonging to the same thousands group have their respective thousands digit omitted, it being understood that the last digit in each of the numbers represents the number of charges for the call, and that the code for the period character is represented by a dot. In the physical appearance of the thousands tape, all the digits belonging to one line, instead of being punched transversely on the tape as schematically shown in Fig. 14, are punched lengthwise as shown in Fig. 13A since the only thing punched transversely are the codes of each of the digits. The tape in Fig. 14 is shown by actual numbers rather than codes therefor and all the numbers of one line record are shown transversely instead of lengthwise because this kind of showing lends itself more readily to an understanding of the principles involved in its production.

When the office tape is completely run through, there will have been produced ten different thousands tapes, one by each of the correspondingly numbered perforator circuits available to the distributing circuit. After the last line record in the office tape has passed over the sensing fingers 736, key 705 is operated. The operation of this key causes ground to be applied to conductor 739 from the No. 10 contacts of relay 721 via the contacts of said key, and since this conductor extends to the winding of relay 802, said relay operates in series with relay 806. Moreover, since brush 611 is, at this time, engaged with the terminal connected to the winding of relay 615, said relay is caused to operate over a previously described circuit. A circuit is now completed for relay 510 which extends from ground on the No. 1 back contacts of relay 801, No. 5 contacts of relay 805, No. 7 back contacts of relay 803, No. 8 back contacts of relay 804, No. 3 front contacts of relay 802, conductor 819, winding of relay 510 to battery. Relay 510 operates. Over its No. 1 contacts it applies battery through resistance 519 and conductor 518 to the winding of relay 606 which relay, however, is short-circuited by ground on the No. 3 contacts of relay 225 applied to conductor 236 and thence to conductor 253. Over its No. 2 to No. 11 contacts, inclusive, it applies ground to the winding of each of the relays 500 to 509, inclusive, causing said relays to operate and connect all of the perforator circuits to the thousands register via the contacts of relay 615. Since conductor 812 is grounded by the operation of relay 802, relay 102 in each one of the perforator circuits is operated via the No. 7 contacts of relays 500 to 509, inclusive and a conductor 512 extending to relay 102 in each of the perforator circuits. The operation of relay 102 causes a circuit to be completed for relay 211, which extends (by way of example for perforator 2, identical circuits being completed in each of the other perforator circuits) from battery through the winding of said relay, conductor 206, No. 2 back contacts of relay 126, No. 2 back contacts of relay 104, No. 2 contacts of relays 105, 103, 102 and 101 to ground. Relay 211 operates and by opening its lower back contacts, opens the locking circuit of relays 106 and 107 which now release. Relay 211 further prepares one point in the circuit path of relay 225 which is completed over the No. 2 back contacts of relay 132 when the latter relay releases subsequent to its operation as hereinafter set forth.

Since relay 806 is operated in the locking circuit of relay 802, ground is applied to conductor 816 and, therefore, to conductor 201 practically at the same time that ground is applied to conductor 512. Hence, when relay 102 operates, relay 132 also operates, the latter by the circuit completed from ground on conductor 201 and applied over the No. 1 back contacts of relay 130. Relay 132 now causes ground on its No. 1 contacts to be applied to the No. 1 contacts of relay 102 and, thereover, to complete the previously described circuit of punch set magnet 2 in series with the lower winding of relay 130. Since relays 106 and 107 have been released by the operation of relay 211 and relay 132 holds over for an interval after its circuit is opened by the operation of relay 130, the previously described circuit of punch magnet 133 traced through the No. 3 back contacts of relay 107 is now closed, causing said magnet to operate and punch the line feed code on the tape 120.

When relay 132 releases, indicating that the line feed code has been punched on the tape, a circuit is completed for relay 225 which traces from battery through the winding of said relay, front contacts of relay 211, conductor 204, No. 2 back contacts of relay 132, No. 1 front contacts of relay 130 to ground on conductor 201 as previously traced thereto. Relay 225 operates, locks through its No. 1 contacts, conductor 235, conductor 252, to ground on the No. 3 back contacts of relay 606 and disconnects ground from conductor 236 which keeps relays 606 short-circuited. Now when all the perforator circuits have completed the punching of the line feed code on their respective tapes, as evidenced by the operation of relay 225 in each of said perforators, ground is removed in each branch of conductor 236 extending to the No. 2 contacts of relay 225 in each of said perforator circuits whereby the short circuit around the winding of relay 606 is removed, causing said relay to operate from resistance battery 519 over the circuit previously traced. Relay 606, upon operating, completes an obvious circuit for relay 603, closes a supplementary ground to the winding of relay 510 and opens the locking circuit of relay 225 which releases. Relay 603 operates and removes ground from conductor 809, thereby causing the release of relays 802 and 806 in the thousands register, closes an obvious circuit over its No. 3 contacts for release magnet 614 of switch 600, and locks itself to the off-normal springs 613. Magnet 614 upon operating, causes brushes 609 and 611 to be restored to their normal position in which the off-normal contacts 613 open to unlock relay 603.

With the release of the register relay 802, ground is disconnected from conductor 819, thereby removing one holding ground for relay 510 and when relay 606 releases, due to the reestablishment of the short circuit around its winding as a consequence of the release of relay 225 as above described, relay 510 releases and disconnects ground from the windings of relays 500 to 509, inclusive, thereby causing the disconnection of all the perforators from the distributor circuit. Key 701 is now released, thereby releasing relay 721. Key 705 is also released.

Thus from the original office tape, ten other tapes have been produced, each characterized by a different thousands digit which appears as part of the first line number in each of the different thousands tapes, other numbers on the same tape having the thousands digit omitted as shown in Figs. 14 and 14A.

SECTION III.—DISTRIBUTION BY HUNDREDS

Each thousands tape is now passed through transmitter 710 for the purpose of separating all of the numbers appearing thereon according to the hundreds digit of the respective line designations. In this operation, the first number heading each thousands tape will be repeated in the "hundreds" tapes, but for each number thereafter on each of said tapes only the tens, units, charge and the period codes will be perforated, the hundreds, like the thousands digit, will be omitted. From which it is evident that from each thousands tape there will be produced as many different hundreds tapes as there are different values of the hundreds digits in the various line numbers on the thousands tape. For instance, if it should happen that, in a thousands tape, all of the ten different values of the hundreds digit appear in the hundreds place of the several line numbers therein, ten "hundreds" tapes will be produced from the one thousands tape, one for each of the different hundreds digits. On the other hand, if less than all of the ten different values of the hundreds digit appear among the hundreds digits of the several line numbers of the thousands tape, the number of hundreds tapes produced will depend upon the number of different hundreds digits, in no case, of course, more than ten.

The various thousands tapes are run through the transmitter 710 in the order indicated by the thousands digits, beginning with the zero (0) thousands tape and ending with the nine (9) thousands tape. In order to describe the production of the hundreds tapes from each of the thousands tapes, let it be assumed that the zero or first thousands tape is to be run through. For the purpose of analyzing a thousands tape according to the hundreds digit of each of the line numbers therein, key 702 is operated, whereupon relay 719 is operated over an obvious circuit. Start key 700 is also operated and ground is applied thereby to conductor 722 for operating relay 810 whereby the transmitting conductors 724-728 are connected with the register relays 801-805 of the thousands register. The zero thousands digit code calls for perforations in positions 3 and 4 of the tape. Hence the thousands digit perforations of the first line number cause conductors 726 and 727 to be grounded and relays 803 and 804 to be operated and locked in series with relay 806. Although by this operation conductor 820 is grounded and would normally result in the operation of relay 500 if distribution by thousands were taking place as already described in Section II since, in case of distribution by thousands, relay 721 would be operated, yet, in distributing by hundreds and because relay 719 is operated, the cut-in relay in the group of relays 500-509 that will be operated will depend, instead, upon which conductor in the group of conductors 920-929 of the hundreds register will be grounded by the operation of register relays therein, the operation of the latter depending, in turn, upon what the hundreds digit of the first line record in the zero thousands tape being run through happens to be. The above-mentioned group of conductors 920-929 corresponds to the group of conductors 820-829 of the thousands register, the latter terminating at the contacts of relay 721 and the former terminating at the contacts of relay 719. Hence the perforator to be selected, in distributing a thousands tape by the hundreds digit of each of the line numbers therein, will not depend upon the thousands digit of the line number as it did when distributing the office tape by thousands, but upon the hundreds digit of each of the line numbers in the thousands tape. The thousands digit number, however, is registered in the thousands register, relays 803 and 804 being locked in series with relay 806 which is also operated.

The operation of relay 806 closes previously described circuits for operating the transmitter magnet 711 by which the tape is advanced to the hundreds digit perforations and for operating relay 706. As a result of the operation of the latter, a circuit is completed for step magnet 715 which, in operating, advances brushes 712 and 713 to their respective second terminals, bringing the latter brush into engagement with conductor 734 that extends to the winding of relay 818. Furthermore, since relay 719 is now operated, ground is connected to conductor 626 through the No. 10 contacts of said relay and a circuit is accordingly completed for relay 807 through the No. 2 contacts of relay 806. Relay 807 operates, locks over its No. 2 contacts, conductor 817 to ground on the No. 2 back contacts of relay 606, locks register relays 803 and 804 with relay 806 over the No. 1 contacts of said relay 807 to ground on conductor 817, thus making the locked relays in the thousands register independent of ground on conductor 809 which, it will be remembered, is removed by the operation of relay 603 after the perforation of the period code or the line feed code.

Conductors 724-728, inclusive, are now grounded in accordance with the perforations of the hundreds digit, and relays 901-905, inclusive, in the hundreds register are selectively operated in response thereto and locked through the winding of relay 906 in a manner identical with that already described for the relays of the thousands register when distributing the line records on the original tape by thousands. Now, depending upon the combination of relays operated in the hundreds register, one of the conductors in the group 920-929 included within the bracket line 930 will be grounded. Since relay 719 is operated, the ground on said conductor will be applied to one of the straps joining all armatures of the relays 717, 718, 719 and 721 and continued therefrom to the winding of one of the relays 500-509, inclusive, causing the appropriate one of said relays to operate and connect its associated perforator circuit to the distributing circuit. In other words, the perforator circuit now to be joined to the distributing circuit is the one that corresponds to the numerical value of the hundreds digit of the first line number appearing on the 0 thousands tape.

Switch 600, at the beginning of hundreds distributing operation, has its brushes 609 and 611 engaged to their respective first terminals. Hence relay 615 will be operated, as in the case of preparing the thousands tapes, and since a perforator circuit is joined to the distributor circuit and to the thousands register in which the code of the thousands digit is registered, (the thousands digit assumed to be 0) perforating operations by the perforator selected in accordance therewith will now proceed as before, causing said perforator to punch the entire first line number including the charges and the period as it appears on the thousands tape as already described in Section II in connection with the preparation of the thousands tapes. That is, if the thousands tape analyzed is the 0 thousands tape, then the perforator which is connected to the distributor for the perforation of the first line number appearing on said tape will be the one indicated by the hundreds digit of said number, which digit, being registered in the hundreds register, causes the operation of the appropriate relay 500-509 as determined by the registration and the circuit completed thereby to one of said relays through one of the contacts of relay 719. Thus, for example, if the first line record on the thousands tape happens to be 02784., the thousands digit 0 will be registered in the thousands register, the hundreds digit 2 will be registered in the hundreds register, the tens digit 7 will be registered in the tens register, the units digit 8 will be registered in the units register, the charge digit 4 will be registered in the charge register, and the period will be registered in the period register. The perforator which is now selected will be that determined by the hundreds digit instead of the thousands and since this digit is assumed to be a 2, relay 502 will be operated, in consequence of which perforator 2 will be connected to the distributor. Also, since the brushes 609 and 611 of switch 600 are engaged with their respective first terminals and key 612 is operated, relay 615 is likewise operated and perforator 2 is further connected to the thousands register. Since the digit 0 is registered therein, then, according to operations described in Section II, the code of the 0 digit will be transferred to the relays 101-105 and the 0 code will be caused to be perforated on tape 120. Subsequent to the perforating operations, relay 615 is released and the thousands register is disconnected from the perforator. However, in contrast to the release of the register relays when preparing the thousands tape, the 0 registration (relays 803 and 804) instead of releasing when ground is removed from conductor 809, is now held locked to ground on conductor 817 through the No. 1 front contacts of relay 807 which, it will be recalled, is locked to this same ground under the control of the No. 2 back contacts of relay 606. The remaining digits, including the period, are now caused to be perforated on tape 120 by the successive connection with perforator 2 of each of the involved registers through the successive operation of the cut-in relays 616-620. After the code of the period has been punched, relay 603 operates as before described.

Returning, now, to the further description of the invention, the operation of relay 603 causes the release of the digits locked in the hundreds, tens, units, charge and period registers and the release of relay 708 of the distributor as already described, but the thousands digit registration will remain undisturbed in the thousands register inasmuch as ground on conductor 817 is still applied thereto since relay 606 remains normal throughout the above-described operations.

The operation of relay 1206' of the period register closes a circuit for the transmitter magnet 711 which operates to cause the advance of the tape to the code perforations of the first digit of the second line number, and another circuit for relay 706 which, in operating, causes the advancement of brushes 712 and 713 to their respective seventh terminals from which the brushes are advanced to their respective first terminals in the described manner.

The second line record contains no thousands digit, the digit immediately following the period of the first line record being the hundreds digit of the second line record. Relay 807, however, remains locked operated in the thousands register so that, as soon as brush 720 engages its first terminal, ground on conductor 818 causes relay 709 to operate and complete a circuit for magnet 715 which extends from ground on the contacts of key 700, No. 1 back contacts of relay 708, winding of relay 707, front contacts of relay 709, winding of magnet 715 to battery. Both relay 707 and magnet 715 operate, the former to disconnect ground from brush 713 and the latter to advance brushes 712 and 713 to their respective second terminals in the manner previously described.

It is now apparent why relay 707 is used to break the start ground to brush 713 of switch 720. The second line record contains no thousands digit, this being the same as that of the first line record and is locked in the thousands register under the control of relay 807. The first line of perforations on the second line record is that of the hundreds digit and ground on conductor 818 signals switch 720 to skip the thousands register. However, if at this time the ground on brush 713 is not interrupted, the circuit to relay 810 would be completed in the interval that switch 720 is preparing to advance and, with relay 810 operated, the hundreds digit would be falsely registered in the thousands register, spoiling thereby the thousands registration already locked therein. Hence to avoid the possibility of such an occurrence, relay 707 is utilized to hold the ground path to brush 713 open until relay 707 releases, which indicates, by its release, that the brushes of switch 720 have been advanced to the hundreds register.

With the connection of brush 713 to conductor 734 and upon the release of relay 707, relay 910 operates to extend conductors 724-730, inclusive, to the register relays of the hundreds register. The selective grounding of conductors 724-728, inclusive, in the combination called for by the perforations of the hundreds digit of the second line number, will cause the selective operation of relays 901-905, inclusive, in the combination required by the code of that digit, which relays will then lock in series with relay 906.

The perforator circuit called for by the registration of the hundreds digit will then be connected to the distributor circuit through the operation of the appropriate cut-in relay of the perforator connector of Fig. 5. If the hundreds digit of the second line number is different from that of the first line number, then the perforator circuit caused to be selected by this digit will be different from that caused to be selected by the hundreds digit of said first line number, in which event it will be necessary for the selected perforator circuit to punch the entire second line record, including the thousands digit which is locked up in the thousands register on the tape 120 controlled by the perforator circuit selected by the hundreds digit of the second line record. Thus if the first line record is 05673. and the second one is 2516. (the thousands digit 0 being omitted) the perforator circuit selected by the first line record, in distributing by hundreds, would be perforator circuit No. 5 whereas the perforator selected by the second line record, in distributing by hundreds, would be perforator circuit No. 2. Upon the selection of perforator No. 2, the entire record for the second line, namely, 02516., will be punched upon the tape 120 controlled by the perforator circuit No. 2.

Assuming, then, that the hundreds digit of the second line number is different from that of the first; that is, it may be assumed to be 2, the selected perforator No. 2 will proceed to punch the entire record of the second line number. Brushes 609 and 611 are engaged with their respective first terminals. Relay 615, therefore, operates in consequence, and since the 0 thousands digit is registered in the thousands register, the code of the same will be punched on the tape.

The punching of the code of each of the remaining digits (including the charges and the period) for the first line record to be punched by perforator circuit 2 will take place in the manner already described, leaving the perforator circuit, after the punching of the period code, with relays 106 and 107 operated.

In the event that the hundreds digit of the second line number is the same as that of the first, the same perforator circuit will be selected for making the record of the second line record as was selected for making the first and, in this case, both the thousands and hundreds digits will be omitted. The reason for this is because, on the punching of the first line record by the perforator circuit when distributing by hundreds, relays 106 and 107 were left in a locked condition. Consequently, when the perforator circuit is again connected to the distributor circuit and to the registers, relay 107 will have closed a previously described circuit for relay 607, causing said relay to operate. Since the brushes of the switch 600 are connected to their respective first terminals, a circuit is now completed for relay 604 which extends from battery through the winding of said relay, brush 609 and the terminal engaged thereby, No. 1 contacts of relay 607, conductor 626, No. 10 contacts of relay 719, to ground. Relay 604 operates and completes a circuit which extends from battery through the winding of stepping magnet 608, front contact of relay 604, winding of relay 602, No. 2 contacts of relay 603 to ground through the contacts of keys 612. Relay 602 operates to open the path of relay 615 which, in remaining normal, keeps the thousands register from being connected to the perforator, and magnet 608 operates to step brushes 609 and 611 to their respective second terminals, thereby causing the release of relay 602. When brush 611 engages terminal 2, a previously traced circuit for relay 616 is closed, operating that relay and connecting the hundreds register with the perforator.

The hundreds digit, as recorded in the hundreds register, is now transferred to the perforator register relays 101-105 by the operation therein of the appropriate combination of said relays and resulting thereby in the closure of already described circuits for operating the punch-set magnets 1-5 and relay 130 in series therewith. However, since relays 106 and 107 are still locked up, the circuit for the punch magnet 133 to punch the code of the hundreds digit is not completed but is diverted, in the manner already described, to cause the operation of relay 112. Thus the hundreds digit code is not punched, but the circuit of the punch magnet 133 for the punching of the succeeding digits is completed through the front contacts of relay 113 as already described. Upon the punching of the last or period code of the second line number, relay 108 is operated to release relays 112 and 113 while the registration of the thousands digit will remain locked in the thousands register.

In the same way every succeeding number having the same hundreds digit will cause the selection of the same perforator circuit, and all digits will be punched on the tape controlled by said perforator circuit, the thousands and hundreds digits being omitted.

The codes of the tens, units, charge and period of all other succeeding line records on the 0 thousands tape will now be punched on the various "hundreds" tapes thus produced. Since the last entry on this tape (as well as the other thousands tapes) is the "line feed" code, and since the distributor will skip the thousands register by virtue of the operated condition of relay 807 as a result of the thousands digit 0 being registered in said register, the line feed code will be registered in the first free register which, in this case, will be the hundreds register. Relay 616 is operated in the manner previously described and the grounding of conductor 725 by the line feed code perforation will complete the circuit of relay 902 in series with relay 906. A circuit is now completed for relay 510 extending from battery through the winding of said relay, conductor 810, conductor 919, No. 2 front contacts of relay 902, No. 8 back contacts of relay 904, No. 7 back contacts of relay 903, No. 5 back contacts of relay 905, No. 1 back contacts of relay 901 to ground. Relay 510 operates, completes a circuit to each of the relays 500-509 as before described, thereby to connect all ten perforator circuits to the hundreds register and to apply resistance battery to relay 606 which remains shunted to ground over the No. 3 back contacts of relay 225 in each of the perforator circuits. With the connection of said perforator circuits to the hundreds register, the line feed code registration in the hundreds register is transferred to relay 102 of the register relays 101-105 in each of the perforator circuits, the circuit of said relay 102 in each of said perforator circuits being traced from ground on the No. 1 front contacts of relay 902, conductor 912, No. 5 contacts of relay 616 (which operated as a consequence of the switch 600 skipping the thousands register in the manner described), conductor 632, No. 7 contacts in each of the relays 500-509, conductor 512 extending from each of said contacts to each of the associated perforator circuits, winding of relay 102 in each of said circuits to battery. The operation of relay 102, coupled with the operation of relay 132 in each of said perforator circuits, causes each of said perforator circuits to punch the line feed code on their respective tapes 120 following which the disconnection of said perforator circuits from the hundreds register takes place in the manner described, including the previously described release of relays 106 and 107 and, in this case, also the release of relay 807 and register relays 803 and 804 in the thousands digit register upon the operation of relay 606 which, as previously described, will also release as soon as relay 225 in one of the perforator circuits releases. All the circuits are now normal. Key 702, however, is still operated and, therefore, relay 719 is also operated.

Assuming, as said before, that the 0 thousands tape is the first one run through the transmitter 710, then after the line feed code has been punched on all the ten hundreds tapes produced from the 0 thousands tape, the next in order or the "1" thousands tape is inserted in the transmitter 710. As a result of operations identical with those described above, the line records thereon are distributed in the manner previously described on the continuation of the ten hundreds tapes so far produced, remembering always that the thousands and hundreds digits are not punched. When all of the ten thousands tapes are thus run through in the ascending numerical order indicated by the respective thousands digits thereof, the original office tape will have been resolved into ten separate tapes on each of which the first line record of each different thousand is punched in its entirety thereon, but every succeeding line record thereafter in the same thousands has its thousands and hundreds digits omitted. Between the line records of one one-thousand group and those of another one-thousand group on the same tape there is punched the "line feed" code followed, in turn, by all the line records of the succeeding thousand line group belonging in the same hundred, all line records of each group except the first record having their thousands and hundreds digits omitted.

The schematic appearance of one of the hundreds tapes is shown in Fig. 15. The tape therein shown is the one made from the distributing operations according to the hundreds digit 7. The first record is that of the first line in the 0 thousands tape having 7 for a hundreds digit. Thereafter follow all line records having both 0 and 7 for thousands and hundreds digits, respectively. The last entry following the last line record is the line feed code and is punched on this tape at the same time that it is punched on all the other nine tapes. When the 1 thousands tape is distributed according to hundreds, the first line record thereon having 7 for a hundreds digit is punched in its entirely immediately following the line feed code, after which all other line records in the 1 thousands tape having 7 for a hundreds digit are punched, but with the thousands and hundreds digit omitted. The last record is followed by the line feed code and the operations continued with all the succeeding thousands tapes, thereby producing ten separate tapes each similar to that illustrated by Fig. 15 except for the fact that the hundreds digit will be different for each tape. Fig. 15A shows the disposition of the numbers as actually appearing on the tape.

SECTION IV.—DISTRIBUTION BY TENS

The next step in the operation is to make ten tapes from the ten hundreds tapes already produced, and this is done by running each one of the separate hundreds tapes through the transmitter 710 in the numerical order indicated by the separate hundreds digits, that is, by running the 0 hundreds tape first followed by the 1 hundreds tape, etc. In this case, however, the perforator circuits are selected in accordance with the tens digit in each one of the line numbers of the line records and the tapes which result are the consequence of the distribution of said records in accordance with the tens digit. As in the case of the previous thousands and hundreds tapes, the first line record in each of said tapes is punched in full but every line record thereafter will have its thousands, hundreds and tens digits omitted.

In order to effect this distribution by tens, the 0 hundreds tape is inserted in the transmitter 710, and keys 703 and 700 are operated. An obvious circuit is thereupon closed for relay 718 which, in operating, connects the conductors 1020–1029 from the tens register to the commoned conductors extending to the perforator cut-in relays 500–509, inclusive, ground is once again applied to conductor 722 in the manner described, and ground is applied to conductors 626 and 627 from the No. 10 and No. 11 contacts, respectively, of relay 718 for operating relays 807 and 907 after the operation of relays 806 and 906, respectively.

As described in Section III in connection with distribution by hundreds, the thousands and hundreds record, being 00 in the case of the tape produced from the 0 thousands tape distributed by the 0 hundreds and assumed to be the first to be operated upon in distributing by tens, the thousands and hundreds digits (00) of the first line record on the tape are registered, respectively, in the thousands and hundreds registers, and the perforator circuit selected is the one designated by the tens digit of said line record, after which the entire line record is punched on the tape controlled by that perforator. Every line record thereafter having the same tens digit will cause the seizure of the same perforator circuit in the manner already described in Section III with respect to distribution by hundreds, which then proceeds to punch only the codes of the units digit, the charge and the period. Every line record which has a different tens digit will cause the selection of the perforator circuit designated by that digit and said perforator circuit then operates to punch the entire line record containing the tens digit which caused the selection of that perforator.

As in the case of producing the hundreds tapes from the thousands tapes, the thousands digit is stored in the thousands register by the operation of relays 803 and 804 and locking the same to ground on conductor 817 via the No. 1 front contacts of relay 807 in the manner described. The hundreds digit is now also stored in the hundreds register by the operation of relays 903 and 904 and locking the same through the No. 1 front contacts of relay 907 which transfers the locking ground to conductor 917 as applied thereto over conductor 817 from the No. 2 back contacts of relay 606. This ground is not removed until after the line feed code is punched on all of the ten "tens" tapes. Similarly, the thousands and hundreds registrations are now skipped on all succeeding line records of a tens tape by virtue of ground being connected to conductors 626 and 627 from the Nos. 10 and 11 contacts, respectively, of relay 718 which cause previously described circuits for step magnet 608 to effect two steps of movement of switch 600 whereby brushes 609 and 611 are stepped to their respective third terminals, the latter brush, in stepping over the first and second terminals, precludes the operation of relays 615 and 616, respectively, and prevents the connection of the thousands and hundreds registers to the perforator circuit, while in engaging the third terminal, it causes the operation of relay 617 and the connection of the tens register to said perforator circuit. Subsequent to the punching of the tens digit for the first line record which appears on the tape controlled by the perforator circuit caused to be selected by said tens digit, the punching of the tens digit of succeeding line records is omitted because of the locked condition of relays 106 and 107 consequent to the punching of the first line record and the operation of relays 112 and 113 for the succeeding line records. The circuit of punch magnet 133, for the punching of the units, charge and period codes is then closed through the front contacts of relay 113. Since all of the above circuits and operations have been traced and described for the punching and skipping of the hundreds digit their repetition for the tens digit is not believed necessary. The tens and units digits of the designation numbers of similar pieces of apparatus and conductors in all the registers have been made alike to facilitate the tracing of circuits herein not described in detail but which are identical with those already described.

The last entry on the 0 hundreds tape is the line feed code. Since relays 806 and 906 are each locked in series with relays in their respective thousands and hundreds registers that hold a zero registration, switch 720 is automatically advanced to the third position where brush 713 completes the circuit of relay 1010. Subsequent to the operation of this relay the "line feed" code is registered in the tens register by the operation therein of relay 1002 over a circuit completed from ground on conductor 725 (applied thereto by the line feed code of the tape being sensed), No. 2 contacts of relay 1010, winding of relay 1002, winding of relay 1006 to battery. Both of these relays operate. Relay 1002, by applying ground to conductor 1019 completes the circuit of relay 510 over a path traceable from ground on the No. 1 back contacts of relay 1001, No. 5 contacts of relay 1005, No. 7 back contacts of relay 1003, No. 8 back contacts of relay 1004, No. 3 front contacts of relay 1002, conductor 1019, conductor 819, winding of relay 510 to battery. This relay now operates and causes the operation of the cut-in relays 500–509, and since relay 617 is also operated at this time, all the perforator circuits are connected to the tens register whereupon the circuit of relay 102 in each of the perforator circuits is completed from ground on conductor 1012 over an easily traceable circuit therefrom to battery through the winding of relay 102 in each of the perforator circuits. The punching operations in each of said perforator circuits are initiated by ground on conductor 1016 applied thereto over the No. 1 contacts of relay 1006. As a consequence, the line feed code is punched on each of the tens tapes and the circuits thereafter restored in the manner previously described for their restoration after the punching of the line feed code on the hundreds tapes.

All the other hundreds tapes are now passed through the transmitter 710 in the order of their hundreds digit designation and the line records contained therein are punched on the tens tapes in the order of distribution indicated by the individual tens digits in each of the line records, the line feed code being punched as a last entry on each of the tapes in the manner already described.

It should be noted in connection with all sensing and punching operations and as previously described in connection with the functions of relays 603 and 708, that positive interlocks exist between the operation of the perforator circuits and the operation of the distributor circuit. Regardless of which distribution operation is taking place, relay 708, which is operated after the distributor has sensed one line record (in the case of any line record after the first on a "tens" tape said record consisting only of the tens, units, charge and period codes), remains locked to ground on conductor 809 under control of the No. 3 back contacts of relay 603 and prevents the distributor from any further sensing operations until relay 603 shall have operated to disconnect ground from said conductor to release the registers and release relay 708. Since the engaged perforator circuit is not advanced into connection with a succeeding digit register until it has punched the code of the digit registered in the preceding digit register (as evidenced by the operation of relay 601 after each punching operation), and since relay 603 is not operated until the engaged perforator circuit has made a complete round of all the digit registers (as evidenced by brush 611 of switch 600 being advanced to terminal 7, at which point the circuit of relay 603 is closed as previously described), it follows that when relay 603 operates and removes ground from conductor 809 to release the operated registers and release relay 708 to initiate thereby another cycle of operations for the distributor, a positive signal is thereby provided that the involved perforator circuit has been disconnected from the register with which it was last connected and that the registers which have no digits locked therein are free to be reset by the appropriate sensing operation of the distributor.

Thus from the ten "hundreds" tapes, ten "tens" tapes are produced, each of these being divided into sections, by line feed codes, each section containing all line members having the same thousands, hundreds and tens digit and in each of which only the first line record is punched in full but all succeeding line records have only their units, charge and period codes punched. A conventional form of a tens tape is indicated in Fig. 16 which shows, in abbreviated form, the tens tape which results from distributing the hundreds tapes according to the tens digit 7 in each of the line records appearing thereon. It will be seen, in comparing the tape of Fig. 16 with that of Fig. 15, that all the line records in the latter which have a digit 7 for the tens digit now appear in the former with their tens digit omitted except in the case of the first line record. The tape shown in Fig. 16 is of similar import to that shown on Fig. 15.

SECTION V.—DISTRIBUTION BY UNITS

The tens tapes have the complete line number punched for the first line record and only the units digits, the charge and the period for the remainder of the lines in each of the tens groups of records punched on the tens tapes, the line feed code being used to separate the various tens groups.

Each of the ten "tens" tapes is now run through the transmitter 710 in the order of succession indicated by their respective thousands, hundreds and tens digits, beginning with 000 and ending with 999. The purpose in this case is to produce ten tapes from the ten "tens" tapes, line records of which are distributed according to the units digit of each of the line records. Unlike the preceding tapes, however the tapes thus produced will not only have their respective first line records punched in their entirety and all succeeding records having the same units digit omitted but the charges for the liner having the same units digit will be accumulated since, if the units digits of the line records are identical, the separate records must be for the same line.

In order to effect sorting by units, key 704 is depressed, resulting in the operation of relay 717 over an obvious circuit closed by said key. Start key 700 is also closed. The first tape assumed to be run through is the 000 tape, that is, the tape which has as its first line record a number comprising 0 for each of the thousands, hundreds and tens digits. In accordance with operations already described, these digits of the first line record are permanently locked in the thousands, hundreds and tens registers, respectively, while the units digit (which may be of any value) when registered in the units register causes the selection of a correspondingly numbered perforator circuit. The line number of the first line record is then punched by the selected perforator in the manner described. On the punching of the units digit of said first line record, however, the operation of relay 618 completes a circuit for relay 109 which extends from battery through the winding of said relay, No. 1 back contacts of relay 110, conductor 135, No. 10 contacts of relay 502, conductor 735, No. 13 contacts of relay 717, conductor 629, to ground on the No. 7 contacts of relay 618. Relay 109 operates and applies ground through its No. 1 contacts to one side of the winding of relay 110, its other side being grounded through the No. 2 back contacts of relay 229. While relay 109 is operated and relay 110 is thus short-circuited, a circuit is completed for relay 227 which extends from ground on the No. 2 contacts of relay 110, No. 3 contacts of relay 126, No. 3 contacts of relay 109, conductor 207, winding of relay 227 to battery. Relay 227 operates to perform functions noted hereinafter. When the units digit is punched and relay 618 releases in consequence, operating ground is removed from one side of relay 110 and this relay now operates in series with relay 109, both locking to ground on the No. 2 back contacts of relay 229. Relay 227 now releases but, in the meanwhile, it will have performed the functions to be described hereinafter.

SECTION VI.—CHARGE ACCUMULATIONS

In producing the final tape through the "distribution by units" operations, the charges for the same lines are accumulated in the computer shown in Figs. 2, 3, 3A and 4, of which one is integral with and forms a part of each perforator circuit.

To explain in brief the principle of charge accumulation, attention is directed to Fig. 19A in which is schematically illustrated the three registers involved by the accumulation, and the circuits by which their operation is controlled to receive, add and accumulate the various charges perforated on the ten's digit tape.

As noted in Fig. 19A, there are three relays, each symbolizing one of the three registers; namely, the receiving register, the accumulating register and the adding register. Briefly, the receiving register is selectively operated in response to the charge code digit which is set up in relays 101–105 of the perforator circuit; the accumulating register is operated in response to an initial zero setting which takes place before the first charge code affects the receiving register; the adding register is then operated in response to digital settings of the receiving and accumulating registers to add both digits; the accumulating register being thereafter released and reset by the adding register to transfer the digital summation from the adding to the accumulating register; the adding register being then released but the digital sum being retained in the accumulating register. When the receiving register is reset in response to the code of the next charge digit, the adding register is again operated in response to the digital sum in the accumulating register and the charge digit in the adding register, making a new sum which is subsequently transferred to the accumulating register. In this manner, the accumulating register is operated after each setting of the adding register, and when all the charge digits for a particular line have been received by the adding register, the perforator circuit is operated in response to the last setting of the accumulating register to punch on the tape 120 associated therewith the total charges next to the punched line number.

As previously stated, when the units digit of the first line record is being punched, the relays of the accumulating register are selectively operated by relay 227 to register the zero digit in accordance with a code given below. The operated relays of the accumulating register lock over conductor 247, the normally made contacts of the continuity set of contacts on relay 229, to ground on the normal contacts of relay 225. When the punching of the units digit is completed, relay 227 is released and the original operating circuits for the relays of the accumulating register are opened, the relays operated by these circuits remaining locked to ground on conductor 247. After the units digit of the line number is punched on tape 120, relays 101–105 of the perforator circuit are reset to the code of the charge digit and these relays then complete circuits to selectively operate relays of the receiving register whereby the latter is set to register the charge digit. Now conductor 247 is connected to the contacts of the relays of the receiving register, and the mates of these contacts are a part of a conductor network which extends to the contacts of the relays of the accumulating register the mates of which, in turn, form a part of a conductor network which extends to the operating windings of the relays of the adding register. Consequently, when the relays of the receiving register are selectively operated in response to the charge digit, and since the relays of the accumulating register were previously selectively operated and locked to register the 0 digit, ground on conductor 247 completes circuits through the contacts of the relays of the receiving register and those of the accumulating register by which the relays of the adding register are selectively operated to register the sum of the digit zero registered in the accumulating register and the charge digit registered in the receiving register.

It will be shown that during the reception of the period code (which follows the registration of the charge digit), relay 228 is operated, in turn to operate relay 229 over an obvious circuit. The closure of the upper set of contacts on relay 228 causes ground to be applied to conductor 249 which effects a locking of the operated relays in the receiving register. Since relay 229 operates after relay 228, ground is disconnected from conductor 247 after it is applied to conductor 249. The result is that those relays of the adding register which were operated by circuits completed by ground on conductor 247 applied through the contacts of the relays of the receiving and those of the accumulating register are locked to ground on conductor 249 before the operating circuits of these relays (that is, the relays of the adding register) are opened by the removal of ground on conductor 247. The removal of this ground opens, of course, the locking circuits of the operated relays in the accumulating register, causing these relays to release and thus restore the accumulating register, not to the previous zero setting but to normal, that is, with all the relays of the register in the unoperated condition.

It is thus evident that, as the result of the application of ground to conductor 249, the relays in the adding register which were previously operated to store the sum of the digit in the accumulating and the digit in the receiving registers are locked to ground on this conductor and that, as the result of the disconnection of ground from conductor 247, the operated relays of the accumulating register are or may be released (as noted in the next paragraph) and restored to normal.

Now when relay 229 operates to the extent of closing its front contact, ground is applied to conductor 251 from the normal contacts of relay 225. This conductor extends to a conductor network which interconnects the contacts of the several relays of the adding register with the operating windings of the several relays of the accumulating register. Since the operated relays of the adding registers are locked to ground on conductor 249, it follows that when ground is applied to conductor 251, circuits are completed through the contacts of the relays of the adding register and the associated conductor network to the operating windings of a number of the relays of the accumulating register by which the relays in the latter register are selectively operated to a setting indicative of the digital sum stored in the adding register. This operation, therefore, is merely one of transferring the digital sum from the adding register to the accumulating register and is completely independent of the previous operated or non-operated condition of any of the relays of the accumulating register. For, if it is assumed that one or more of the relays in the latter register are still in the operated condition after ground has been removed from conductor 247, they will merely be reoperated and held over their respective operating circuits by ground on conductor 251. On the other hand, if they have released or were in the unoperated condition at the time ground is removed from conductor 247, the closure of their operating circuits by ground on conductor 251 will cause them to operate and hold to this latter ground.

Subsequent to the above operations, the operating circuit of relay 228 is opened, opening thereby the circuit of relay 229 which releases before relay 228 releases since the latter relay is held to ground through the operated contacts of relay 229. As previously stated, the contacts of relay 229 are of continuity construction, meaning thereby that on the release of the relay, the contact which is connected to conductor 247 is closed to ground before the armature connected to conductor 251 opens with the lower contact to become disconnected from the same ground. Under these circumstances, ground is reapplied to conductor 247 to hold locked the operated relays of the accumulating register before ground on conductor 251 is disconnected to open the circuits by which these relays were originally operated. The accumulating register, therefore, is held to its setting, the release of relay 228 subsequently removing ground from conductor 249 to cause the relays of the adding register to release. With the receiving and adding registers normal, and the accumulating register set to the digital sum previously registered in the adding register, the three registers are ready for the next cycle of operations by which the next charge digit received on the receiving registers is added to the sum in the accumulating register, the total being applied to the adding register and subsequently transferred back to the accumulating register, which takes and holds the setting called for by the new total.

Fig. 19B is a sequence chart indicating the order of operations above described. It will be noted from this chart that there is absolute continuity between the connection of ground on conductor 247 and its disconnection from conductor 251 and vice versa. At the end of the summing cycle, therefore, the accumulating register retains its setting by the operated relays thereof holding to ground on conductor 247.

In order to describe the operation of the computer register in detail, let it be assumed that the first line record is being recorded by perforator No. 2, it having been selected by the first line record on the 000 tens tape (which is assumed to be the first tape run through the transmitter 710) because the units digit of said first line record is a 2.

The operation of relay 110 completes circuits for relays 131 and 126 extending from ground on the No. 5 contacts of relay 110, winding of relay 131 to battery and in parallel therewith, winding of relay 126 to battery. Relays 131 and 126 operate, the same locking over the No. 6 contacts of relay 131 to ground on conductor 205, relay 131 further transferring registering conductors from the punch-set magnets 1, 3, 4 and 5 to the windings of relays 401a, 403c, 404d and 402b, respectively.

Mention has already been made of the fact that during the interval when relay 109 is operated and relay 110 is short-circuited, relay 227 is operated. This relay, by operating, grounds conductors 241–246, inclusive, to set the accumulating register relays 411a–414d; 311a–314d; and 331a–334d, inclusive, of the computer to a zero setting. However, before proceeding with the description of the operation of the computer, consideration will be directed to Figs. 3A and 4 which show the circuit equipment thereof.

Fig. 4 shows three groups of relays; viz., relays 401a–404d; 411a–414d; and 421a–425e. Figs. 3 and 3A, on the other hand, show four groups of relays; viz., relays 311a–314d; 321a–325e; 331a–334d; and relays 341a–345e.

The function of the computer is to add up successive charges for the same line as the record of said line on the appropriate tens tape comes up for analysis when the line records on the tens tape are to be distributed according to their respective units digits. The tens tapes, it will be remembered, have all the several line records appearing thereon arranged in numerical succession except that they are still arranged at random with respect to their respective units digit. Now as the tens tape is fed through the transmitter 710, the units digits cause a redirection of all of the line records to the different perforator circuits in accordance with the units digit indicated so that, in the distribution of the line records amongst the ten perforator circuits, different line records having identical units digits will all be routed each time to the same perforator circuit. But these line records, since they have identical thousands, hundreds, tens and units digits in the line number, are the records of different calls made by the same line. Hence on distributing by units, the records received by each of the individual perforator circuits from a tens tape up to the first line feed code thereon all belong to the same line identified by the first line record punched on the separate tapes associated with each of said perforator circuits, successive line records now differing from each other only in the digit that records the number of charges. And the function of the computer is to add up for each line all the charges appearing in successive records thereof and, when the line feed code is reached, to cause the total to be punched immediately after the line record.

To perform these functions the computer is provided with a "receiving" register comprising relays 401a–404d, which responds to a charge code as it is set up on relays 101–105, inclusive; an "accumulating" register comprising the units accumulating relays 411a–414a inclusive in Fig. 4, the tens accumulating relays 311a–314d inclusive, and the hundreds accumulating relays 331a–334d in Fig. 3 and an "adding" register comprising the units adding relays 421a–425e inclusive in Fig. 4, the tens adding relays 321a–325e inclusive in Fig. 3A and the hundreds adding relays 341a–345e inclusive in Fig. 3. In the process of adding up the charges, the relays of the receiving register respond to relays 101–105 in accordance with the code given below to register the digit representing the charge, it being assumed that no charge is greater than 9 although the invention is not limited to a units digit charge since the register may be expanded to include the registration of as many digits as desired. This charge registration by the receiving register plus whatever charge is already registered in the "accumulating" register is then transferred to the "adding" register which adds the two charges and subsequently transfers the total to the accumulating register. This operation makes it necessary for the accumulating register to have a zero setting prior to the beginning of charge-adding. When the next charge operates relays 101–105, these relays again operate the receiving register and this charge plus the total in the accumulating register is transferred to the adding register which subsequently transfers it to the accumulating register. This process is repeated until the tens tape reaches the line feed code, at which time the total in the accumulating register is caused to be punched on the tape immediately following the record of the line number to which the charges belong.

The codes by which the successive charges are added together by the different registers of the computer are shown below, the plus sign designating an operated condition of the relay indicated, only the letter indication of the relays being supplied for brevity. These codes are derived from the binary principle of addition disclosed in copending application of George R. Stibitz, Serial No. 389,321, filed on April 19, 1941.

*Computer Code—Receiving and accumulating registers*

|   | (−$a$ relay) | (−$b$ relay) | (−$c$ relay) | (−$d$ relay) |
|---|---|---|---|---|
| 0 | − | − | + | + |
| 1 | − | + | − | + |
| 2 | − | + | − | + |
| 3 | − | + | + | + |
| 4 | − | − | + | + |
| 5 | + | − | − | + |
| 6 | + | − | − | + |
| 7 | + | − | + | + |
| 8 | + | + | + | + |
| 9 | + | + | − | + |

*Adding register*

|   | (−$a$ relay) | (−$b$ relay) | (−$c$ relay) | (−$d$ relay) | (−$e$ relay) |
|---|---|---|---|---|---|
| 0 | − | + | + | + | − |
| 1 | − | + | + | + | − |
| 2 | + | − | − | + | − |
| 3 | + | − | − | + | − |
| 4 | + | − | + | + | − |
| 5 | + | − | + | + | − |
| 6 | + | + | − | + | − |
| 7 | + | + | − | + | − |
| 8 | + | + | + | + | − |
| 9 | + | + | + | + | − |
| 10 | − | − | − | + | + |
| 11 | − | − | − | + | + |
| 12 | − | − | + | + | + |
| 13 | − | − | + | + | + |
| 14 | − | + | − | + | + |
| 15 | − | + | − | + | + |
| 16 | − | + | + | + | + |
| 17 | − | + | + | + | + |
| 18 | + | − | − | + | + |
| 19 | + | − | − | + | + |

Returning, now, to a detailed description of the operations necessary to accumulate the different charges for a line when the tens tape is used to distribute the records thereon according to units, it will be recalled that during the interval that the units digit of the first line record is being punched on the tape controlled by the perforator circuit appropriate to that digit, relay 227 was operated and that, as a result, conductors 241–246, inclusive, were grounded. In consequence of said grounding, obvious circuits are closed for relays 414d, 413c, 314d, 313c, 334d and 333c over conductors 241–246, respectively. These relays operate and lock to ground on conductor 247 applied thereto from the No. 2 contacts of relay 225 via the normal No. 1 contacts of relay 229. When relay 227 releases in consequence of the operation of relay 110 as described, the above relays remain locked.

By reference to the above computer code, it will be observed that the operated condition of relays −$c$ and −$d$ in the accumulating registers signifies the registration of the digit 0 therein. Hence when the units digit of the line record is being punched, the units, tens and hundreds accumulating registers are set to 0 by the operation of relay 227.

Now let it be assumed that the charge punched on the first line record is represented by the digit 3. This means that there is a punch in position 3 of the tens tape and another punch in position 5 and by means of operations already described, relays 103 and 105 are operated in consequence thereof. Inasmuch as relay 131 is now operated, a circuit is completed from aforetraced ground on the No. 1 contacts of relay 103, No. 3 front contacts of relay 131, conductor 154, winding of relay 403c to battery. Another circuit is completed from aforetraced ground on the No. 1 contacts of relay 105, No. 5 front contacts of relay 131, conductor 153, winding of relay 402b to battery. Both of these relays operate, and by reference to the above computer code it will be observed that the operation of relays 402b and 403c in the receiving register registers the digit 3 therein. It is now necessary to transfer the value of this digit plus the value of the digit in the units accumulating register into the adding register. Since the digit in the units accumulating register is 0 and that in the receiving register is 3, their sum is 3 and, according to the code of the adding register, the registration of the digit 3 in the adding register requires the operation of relays 421a and 424d therein. Accordingly, when relays 402b and 403c operate, a circuit is completed for relay 421a which extends from battery through the upper winding of said relay, No. 7 back contacts of relay 411a, No. 4 back contacts of relay 401a, No. 6 back contacts of relay 412b, No. 3 front contacts of relay 402b, No. 5 contacts of relay 413c, No. 1 front contacts of relay 403c to ground on conductor 247. Another circuit is closed for relay 424d which extends from battery through the upper winding of relay 424d, No. 6 front contacts of relay 414d, No. 3 back contacts of relay 404d to ground on conductor 247.

At the same time that relays 421a and 424d are operated in the units order of the adding register, relays 313c and 314d cause circuits to be completed to relays 323b and 323c of the tens order of the adding register to cause the digit 0 to be registered therein, while relays 333c and 334d of the hundreds order of the accumulating register cause circuits to be completed to relays 342b and 343c to cause the digit 0 to be registered therein. These circuits are as follows: (1) battery through the upper winding of relay 323c, No. 5 front contacts of relay 313c, No. 4 front contacts of relay 314d, to ground on conductor 247; (2) battery through the upper winding of relay 322b, No. 5 back contacts of relay 312b, No. 4 front contacts of relay 313c, to ground on conductor 247; (3) battery through the upper winding of relay 343c, No. 5 front contacts of relay 333c, No. 4 front contacts of relay 334d, to ground on conductor 247; (4) battery through the upper winding of relay 342b, No. 5 back contacts of relay 332b, No. 4 front contacts of relay 333c, to ground on conductor 247.

Thus the total of the digit in the receiving register and that of the digit in the units accumulating register is carried into the units adding register and the digit 0 has been registered in the tens and hundreds orders of the adding register from the 0 digital settings of the corresponding orders of the accumulating register. The period code now follows the code of the charge digit 3 and would normally result in the operation of relays 102 and 104. However, since relay 110 operates immediately after the punching of the units digit, then when relay 1206' of the period register operates to make ready for the operation of relays 102 and 104, a circuit is completed for slow-operate slow-release relay 248 which extends from battery through the winding of said relay, conductor 209, No. 3 front contacts of relay 110, conductor 516, No. 3 contacts of relay 502, conductor 636, No. 1 contacts of relay 620, conductor 1216', to ground on the No. 1 contacts of relay 1206'. Relay 248 operates after an interval. Over its No. 1 contacts it grounds the No. 1 armature of relays 101-105 via conductor 203, while over its No. 2 contacts it closes an obvious circuit for relay 228 which, in operating, completes an obvious circuit for relay 229 over its No. 3 contacts and applies ground from the No. 2 contacts of relay 225 to conductor 249 whereby relays 421a, 424d of the units adding register, relays 322b, 323c of the tens adding register and relays 342b, 343c of the hundreds adding register are held locked over their respective lower windings and locking contacts. When relay 229 operates, relay 228 locks over its No. 2 contacts, No. 1 front contacts of relay 229, to ground on the No. 2 contacts of relay 225, and said relay 229 supplies ground over its No. 1 contacts to conductor 251 for a purpose noted below. Relay 229 further removes ground from conductor 247 thereby causing the relays in all orders of the accumulating register locked thereto to release, opens the circuit of relays 109 and 110 which now release, and applies ground over its No. 2 front contacts to conductor 234 which, as already described, causes the operation of relay 601 and the consequent operation of step magnet 608 and release magnet 614, the former to advance the brushes of switch 600 to their respective terminals 7 and the latter to return them to their respective terminals 1. Inasmuch as these operations precede by a considerable interval the operation of relays 102 and 104 in response to the period code, said relays 102 and 104 do not get sufficient time to operate. Even if they do operate, the grounded No. 1 armature of relay 102 would be productive of nothing inasmuch as its path is opened at the No. 2 contacts of relay 131 while the grounded No. 1 armature of relay 104 might produce a momentary operation of relay 404d in the receiving register. However, since ground is now removed from conductor 247 by the operation of relay 229, no circuits can be closed to the relays of the accumulating register so that the possible operation of relay 404d as a consequence of the possible unwanted operation of relay 104 is productive of no effect.

Relay 229, while removing ground from conductor 247 on its No. 1 back contacts, causes ground, as said before to be applied to conductor 251. Remembering that the relays in all orders of the accumulating register are released by the removal of ground on conductor 247 and that relays 421a and 424d of the adding register are locked to ground on conductor 249, ground on conductor 251 causes a circuit to be closed for relay 412b which extends from battery through the right winding of said relay, No. 6 back contacts of relay 423c, No. 5 back contacts of relay 422b, No. 1 front contacts of relay 421a, No. 2 back contacts of relay 425e, conductor 251 to ground. Relay 412b operates. A circuit is also closed for relay 413c which extends from battery through the right winding of said relay, No. 7 front contacts of relay 424d, No. 3 back contacts of relay 423c, No. 1 back contacts of relay 425e, conductor 251 to ground. Relay 413c operates. Both relays 412b and 413c complete locking paths to conductor 247 but there being no ground thereon these relays hold over their respective operating circuits.

By reference to the above code, it will be seen that relays 412b and 413c of the units accumulating register, when operated, register the digit 3 which was the total in the adding register.

With ground connected to conductor 251 the digit 0 is now retransferred from the tens and units orders of the adding register back to the tens and units orders of the accumulating registers, which is done by completing circuits to relays 313c, 314d, 333c and 334d. These circuits are as follows: (1) battery through the lower winding of relay 314d, No. 6 back contacts of relay 324d, to ground on conductor 251; (2) battery through the lower winding of relay 313c, No. 7 back contacts of relay 324d, No. 2 front contacts of relay 323c, No. 1 back contacts of relay 325e to ground on conductor 251; (3) battery through the lower winding of relay 334d, No. 6 back contacts of relay 344d, to ground on conductor 251; (4) battery through the lower winding of relay 333c, No.7 back contacts of relay 344d, No. 2 front contacts of relay 343c, No. 1 back contacts 345c to ground on conductor 251.

The release of relay 110 opens the circuit of relay 248 which releases, after an interval, thereby removing ground from the armatures of relays 101-105 and opening the circuit of relay 229 and the operating circuit of relay 228. Relay 229 upon releasing, reapplies ground to conductor 247 thereby providing a previously traced locking circuit for the relays 412b, 413c, 313c, 314d and 333c, 334d which now hold to ground on said conductor, removes ground from conductor 251, and opens the locking circuit of relay 228 which releases and removes ground from conductor 249 thereby unlocking the relays in all orders of the adding register.

In other words upon energization of the receiving register relays, circuits are immediately completed through the contacts of said relays and those of the accumulating register to energize adding register relays representative of the sum of the previous accumulation and the new charge amount. Then when relay 228 is energized, it applies ground to conductor 249 to lock these adding register relays thereto before relay 229 is energized to remove ground from conductor 247, to which the accumulating register relays have been locked. The continuity contacts of relay 229 cause ground to be applied to conductor 251 before it is removed from conductor 247 and the setting of the adding register will consequently be transferred to the accumulating register. The newly energized accumulating register relays will hold through their operating circuits and when ground is removed from conductor 247 these relays will be the only ones remaining energized. Ground will be reapplied to conductor 247 to lock the accumulating register relays thereto before ground is removed from the transfer conductor 251 and when relay 228 releases to remove ground from conductor 249 to release the adding register relays, the adding operation is completed. In those orders of the accumulating and adding registers in which no digits are added or "carried over" from the previous orders of said registers as subsequently set forth, the digit 0 is passed back and forth between the involved orders of the accumulating and adding registers. In what follows these latter operations are not described for those operations of the computer which involve only the units order of the accumulating and adding registers, but it should be understood that, on every cycle, the digit 0 is passed between the tens and hundreds orders of the accumulating and adding registers in the manner above described.

Thus at the end of the analysis of the first line record, the line number is punched on the tape and the charge for the call is registered in the accumulating register. In the perforator circuit relays 131 and 126 remain locked to ground on the No. 4 back contacts of relays 222 via the No. 6 contacts of relay 131 to conductor 205.

The tens tape has now been advanced to the next line record. If the units digit thereof is different from that of the first line record, said digit will cause the connection of the distributor circuit to the perforator circuit indicated by said digit. The reason for this is that the registration in the units register will release upon the operation of relay 603 after the first line record has been analyzed and punched, and the units register is then set to the units digit of the second line record causing thereby the connection of the correspondingly numbered perforator circuit to the distributor circuit and to the registers, after which, if the second record is the first line number routed to the selected perforator circuit, the line record will be punched on the tape controlled by the selected perforator circuit and the charge transferred to the computing registers of said perforator circuit in the manner described. On the other hand if the units digit of the second line record is the same as that of the first (which has been assumed to be 2 for illustrating the operation of the invention) which means that the second record is for the same line as the first, the units register is set for the digit 2 and perforator circuit No. 2 is again connected to the distributor and register circuits. For the second record, however, and in accordance with operations already described in the previous sections, the perforator circuit skips the thousands, hundreds and tens registrations which are locked in the respective registers. When the circuit reaches the units digit punching stage, relay 618 operates, in turn causing the operation of relay 109 which, upon operating and as before, maintains relay 110 short-circuited. The circuits of the perforator circuit code relays 101-105 will, of course, be selectively closed in response to the registration of the units digit in the units register and relay 132 will also operate over a previously described circuit to ground over the No. 1 back contacts of relay 130 thereby causing ground to be applied to the No. 1 armatures of relays 101-105. However, if the circuit paths to the relays 101-105 remain closed long enough for these relays to operate, no digit will be punched since the paths to the punch magnets are opened at the back contacts of relay 131 which, as before described, is locked at this time. Ground on the No. 1 contacts of the operated ones of the relays 101-105 will of course be applied to the windings of the involved relays 401a-404d of the receiving register. But before any of these latter relays can operate, those relays of the group of relays 101-105 which may have operated and closed the circuits of the involved relays 401a-404d will be released. The reason for this is because simultaneously with the assumed operation of relays 101-105, and with relays 109 and 131 operated, a circuit is completed for relay 601 which extends from ground on the No. 4 back contacts of relay 222, back contacts of relay 211, conductor 205, No. 6 contacts of relay 131, No. 2 contacts of relay 109, No. 6 contacts of relay 110, conductor 234 and thence as traced to the winding of relay 601. Relay 601 operates to complete an already described circuit by which magnet 608 is operated to advance the brushes of switch 600 to their respective fifth terminals. Relay 618 is then released and relay 619 operated. With the release of relay 618, relay 110 operates in series with relay 109, both locking to ground on the No. 2 back contacts of relay 229.

The charge code of the second line record now causes the operation of relays 101-105 in the combination indicated by the code. Let it be assumed that this charge code is that of the digit 5. That is, the second call made by the line whose number was first punched on the tape controlled by perforator circuit 2 is to be assessed five charges, the first call having been assessed three charges.

The code of the digit 5 is a punch in the first position of the tens tape and therefore calls for the operation of relay 101. Hence when this relay operates as previously described, ground on its No. 1 armature as traced thereto from the No. 1 contacts of relay 132 completes a circuit via the No. 1 front contacts of relay 131, conductor 152, winding of relay 401a to battery. This relay operates.

There is, now, the digit 5 registered in the receiving register and the digit 3 registered in the units accumulating register. It is now necessary to transfer the total of 8 on these two registers in to the units adding register. According to the code table of the adding register, the code of the digit 8 calls for the operation of relays 421a, 422b and 423c. Hence when relay 401a operates, and remembering that relays 412b and 413c are locked in as a result of the first line record charge and the zero charge originally registered in the accumulating register by the operation of relay 227, three circuits are completed for relays 421a, 422b and 423c, respectively as follows: (1) battery through the upper winding of relays 421a, No. 7 back contacts of relay 411a, No. 5 front contacts of relay 401a, No. 2 front contacts of relay 412b, No. 2 back contacts of relay 402b, No. 2 front contacts of relay 413c, No. 2 back contacts of relay 403c, No. 1 back contacts of relays 414d and 404d, conductor 247 to aforetraced ground thereon; (2) battery through the upper winding of 422b, No. 7 front contacts of relay 412b, No. 5 back contacts of relay 402b, No. 2 front contacts of relay 413c, No. 2 back contacts of relay 403c, No. 1 back contacts of relays 414d and 404d, conductor 247 to ground; (3) battery through the upper winding of relay 423c, No. 7 front contacts of relay 413c, No. 5 back contacts of relay 403c, No. 1 back contacts of relays 414d and 404d, conductor 247 to ground. Relays 421a, 422b and 423c operate and close locking circuits over their respective other winding to conductor 249 on which, however, no ground is yet connected as already explained.

When relay 101 releases, relay 401a releases, and when relay 248 operates, relays 228 and 229 operate as already described, the former to connect ground to conductor 249 thereby locking relays 421a, 422b and 423c, (also relays 322b 323c and 342b, 343c) and the latter to disconnect ground from conductor 247 thereby causing the relays 412b and 413c of the units accumulating register to release and relays 313c, 314d and 333c, 334d of the tens and hundreds accumulating register also to release, and connecting ground to conductor 251. With the connection of ground to conductor 251 circuits are completed by which the total number of charges in the units adding register is now transferred to the units accumulating register. The total number of charges is 8 and, for the units accumulating register, the code of this digit calls for the operation of relays 411a, 413c and 414d. Accordingly, the following three circuits are closed: (1) battery through the right winding of relay 411a, No. 5 contacts of relay 422b, No. 1 front contacts of relay 421a, No. 2 back contacts of relay 425e, to ground on conductor 251; (2) battery through the right winding of relay 413c, No. 7 back contacts of relay 424d, No. 2 front contacts of relay 423c, No. 1 back contacts of relay 425e, to ground on conductor 251; (3) battery through the right winding of relay 414d No. 6 contacts of relay 424d, to ground on conductor 251. These three relays operate and close locking circuits over their respective lift windings to conductor 247 to which they lock when ground is applied thereon upon the release of relay 229 in the manner described. Upon release of relay 228, ground is removed from conductor 249 in consequence of which relays 421a, 422b and 423c release.

We may now assume that the number of charge units for the next call is 6. By virtue of perforator operations similar to those described above, relays 401a and 404d are operated for registering said digit in the receiving register. There is, now, the digit 6 in the receiving register and the digit 8 in the accumulating register. It is, therefore, necessary to transfer the total 14 onto the tens and units adding registers.

With reference to the registration of a number in each of the adding registers, each of said registers is caused to take a setting to the limit of its capacity as indicated in the adding register code. But whenever the number to registered in a particular register exceeds 9, the digit 1 is carried over into the next register of the succeeding order. Thus, in the present case, the number to be registered is 14 and although the entire number, according to the receiving code, can be registered on the units division of the register, yet because the number exceeds 9 the digit 1 is carried over and registered in the tens division of the register so that the number 14 appears as a registration of a 1 in the tens register and 14 in the units register. Now when the accumulating register is reset to take over the registration of the number 14 from the adding register, the setting of the tens adding register for the digit 1 and the setting of the units register for the number 14 will complete circuits to the accumulating register by which the number 14 is registered therein as a digit 1 in the tens division of the register and a digit 4 in the units division of the register, all in the code for the accumulating register. As another illustration, let it be supposed that the number already registered in the accumulating register is 99 in which event the digit 9 will be registered in the tens division of the register and the digit 9 will be registered in the units division of the register. It may further be supposed that a digit 2 is received upon the receiving register and the total of the number in the accumulating register and that in the receiving register are to be added in the adding register. The total is, of course, 101, but remembering what has already been said about the carrying function of each of the divisions of the adding register, the 9 in the units accumulating register and the 2 in the receiving register will total as 11 for the units division of the adding register. The number 11 will accordingly be registered therein in accordance with the adding register code, but since this number exceeds 9, a 1 will be carried over to the tens division of the adding register. However, since the digit 9 is already registered in the tens division of the accumulating register, then the sum of the digit carried over into the tens division of the adding register and that in the tens division of the accumulating register will be 10 and since this number also exceeds 9 then, while 10 will be registered in the tens division of the adding register, the digit 1 will be carried over into the hundreds division of this register. The sum of 99 and 2, therefore, will be added into the adding register, not as a total of 101 but as the digit 1 in the hundreds division, the number 10 in the tens division and the number 11 in the units division of the register. Upon resetting the accumulating registers, the registration of the above numbers in the adding registers will complete circuits to the accumulating registers by which the digit 1 will be registered in the hundreds division of the accumulating register, the digit 0 in the tens division and the digit 1 in the units division.

According to the code table of the adding register, the code of the number 14 calls for the operation of relays 422b and 425e in the units division of the register and relays 322b, 323c and 324d in the tens division of the register. Hence, when relays 401a and 404d operate, and remembering that relays 411a, 413c and 414d are locked in the units accumulating register for the previous total of 8 and, also, that relays 313c and 314d are locked in the tens accumulating register in consequence of the zero setting thereof, the following circuits are completed by which relays 422b, 425e of the units adding register and relays 322b, 323c and 324d of the tens adding register are operated: (1) battery through the winding of relay 425e, No. 5 contacts of relay 411a, No. 1 front contacts of relay 401a to aforetraced ground on conductor 247; (2) battery through the upper winding of relay 422b, No. 7 back contacts of relay 412b, No. 4 back contacts of relay 402b, No. 6 front contacts of relay 413c, No. 3 back contacts of relay 403c, No. 5 contacts of relay 414d, No. 1 front contacts of relay 404d to aforetraced ground on conductor 247; (3) in parallel with relay 425e a circuit path is further completed for relay 324d extending from battery through the upper winding of said relay, No. 5 front contacts of relay 314d, to aforetraced ground for the circuit of relay 425e; (4) battery through the upper winding of relay 323c, No. 5 front contacts of relay 313c, No. 4 front contacts of relay 314d, to ground on conductor 247; (5) battery through the upper winding of relay 322b, No. 5 back contacts of relay 312b, No. 4 front contacts of relay 313c to aforetraced ground on conductor 247.

When relays 101 and 104 release, relays 401a and 404d release and when relay 248 operates, relays 228 and 229 operate as already described, the former to connect ground to conductor 249, thereby locking relays 322b, 323c, 324d, 425e and 422b and the latter to disconnect ground from conductor 247, thereby causing the release of relays 313c, 314d, 411a, 413c and 414d of the tens and units accumulating registers and further connecting ground to conductor 251. With the connection of ground to said conductor, circuits are completed by which the total number of charges in the tens and units adding registers is now transferred to the tens and units accumulating registers. The total number of charges is 14, which means that the units digit 4 will be registered in the group of relays 411a–414d of the units accumulating register and the tens digit 1 in the group of relays 311a–314d of the tens accumulating register. The units digit 4 calls for the operation of relays 412b, 413c and 414d, while the tens digit 1 calls for the operation of relay 312b. Accordingly, the following four circuits are closed: (1) battery through the right winding of relay 412b, No. 4 back contacts of relay 424d, No. 4 normal contacts of relay 423c, No. 2 front contacts of relay 422b, No. 4 back contacts of relay 421a, No. 2 front contacts of relay 425e to ground on conductor 251; (2) battery through the right winding of relay 413c, No. 7 back contacts of relay 424d, No. 2 back contacts of relay 423c, No. 1 front contacts of relay 425e to ground on conductor 251; (3) battery through the right winding of relay 414d, No. 6 contacts of relay 412d to ground on conductor 251; and (4) battery through the lower winding of relay 312b, No. 1 contacts of relay 324d, No. 1 contacts of relay 323c, No. 1 contacts of relay 322b, No. 4 back contacts of relay 325e to ground on conductor 251. These four relays operate and close locking circuits to conductor 247 to which they lock when ground is applied thereto on the release of relay 229 in the manner described.

In the same manner it can be easily shown that each successive charge for the same line is added to the adding register in combination with the charge on the accumulating register and the total of both then transferred to the accumulating register after which the adding register releases. When the total charges take in a tens digit, said tens digit is registered, as already noted, in relays 311a–314d of the tens accumulating register and 321a–325c of the tens adding register in the manner described above. When the total charges run into the hundreds, the hundreds digit thereof is registered in relays 331a–334d of the hundreds accumulating register and relays 341a–345e of the hundreds adding register. It should be noted, however, that relays 333c and 334d of the hundreds accumulating register, when originally operated to give said register a zero setting then caused the digit 0 to be transferred to the hundreds adding register and the latter to retransfer it back to the hundreds accumulating register in the manner described. Now when the digit 1 is to be carried over from the tens adding register to the hundreds adding register, relay 325e in the former register is operated and, when so operated, with relays 333c and 334d operated, circuits are completed for operating relays 342b, 343c and 343d for registering the digit 1 in the hundreds adding register. If any other digit is registered in the hundreds accumulating register (as, for instance, the result of previous accumulating operations), the registration of this digit is retained therein and transferred into the hundreds adding register and then back to the hundreds accumulating register in the same manner as the original 0 registration and the digit from the tens adding register to the hundreds adding register is transmitted to the latter register over the digital setting of the hundreds accumulating register. Thus, for example, assume that the number 99 is registered in the accumulating register and that the digit 2, registered in the receiving register, is to be added to the total of 99 to make a new total of 101. The units digit 9 is registered in the units accumulating register by the operation and locking therein of relays 411a and 412b, the tens digit 9 is registered in the tens accumulating register by the operation and locking therein of relays 311a and 312b, while the digit 2 is registered in the receiving register by the operation therein of relays 402b and 404d. The digit 9 in the units accumulating register and the digit 2 in the receiving register will cause the total of 11 to be registered in the units adding register by the operation therein of relays 424d and 425e over the following circuits: (1) battery through the upper winding of relay 424d, No. 6 back contacts of relay 414d, No. 3 front contacts of relay 404d to ground on conductor 247; (2) battery through the upper winding of relay 425e, No. 6 front contacts of relay 411a, No. 3 back contacts of relay 401a, No. 5 contacts of relay 412b, No. 1 front contacts of relay 402b, to ground on conductor 247. Relays 424d and 425e thus operate to register the number 11 in the units adding register. Since the number 11 in the units adding register is greater than 9, and the digit 9 is registered in the tens accumulating register, the total of 10 is registered in the tens adding register by the operation therein of relay 325e over the following path: battery through the upper winding of said relay, No. 4 contacts of relays 311a and 312b, No. 4 back contacts of relays 313c and 314d, No. 6 front contacts of relay 411a, No. 3 back contacts of relay 401a, No. 5 contacts of relay 412b, No. 1 front contacts of relay 402b to ground on conductor 247. Relay 325e operates and is the signal that a digit is to be carried over from the tens adding register to the hundreds adding register. Since the digit zero is already registered in the hundreds accumulating register by the operation therein of relays 333c and 334d, the digit 1 (0+1) will be registered in the hundreds adding register by the operation therein of relays 342b, 343c and 344d. The circuits for these relays are as follows: (1) battery through the upper winding of relay 342b, No. 5 back contacts of relay 332b, No. 4 front contacts of relay 333c, to ground on conductor 247; (2) battery through the upper winding of relay 343c, No. 5 front contacts of relay 333c, No. 4 front contacts of relay 334d, to aforetraced ground on conductor 247; (3) battery through the upper winding of relay 344d, No. 5 front contacts of relay 334d to aforetraced ground which completed the circuit of relay 325e. Relays 342b, 343c and 344d now hold over their respective operating circuits.

When relays 228 and 229 operate, ground is removed from conductor 247 causing thereby the release of the relays in all digital divisions of the accumulating register and ground is applied to conductors 249 and 251, the former to supply locking circuits for the operated relays in all digital divisions of the adding register and the latter to supply completing circuits by which the digital divisions of the accumulating register are reset to the total registered in the digital divisions of the adding register, which total is, in this case, 101. Remembering that relays 424d and 425e are operated in the units adding register, that relay 325e is operated in the tens adding register, that relays 342b, 343c and 344d are operated in the hundreds adding register and that all relays in each of the accumulating registers are restored to normal by the removal of ground on conductor 247, circuits are now completed by which relay 412b is operated in the units accumulating register to register the digit 1 therein, relays 313c and 314d are operated in the tens accumulating register to register the digit 0 therein and relay 332b is operated in the hundreds accumulating register to register the digit 1 therein, thus making a total of 101. These circuits are as follows: (1) battery through the right winding of relay 412b, No. 2 contacts of relay 424d, No. 7 back contacts of relay 423c, No. 2 back contacts of relay 422b, No. 4 back contacts of relay 421a, No. 2 front contacts of relay 425e to ground on conductor 251; (2) battery through the lower winding of relay 313c, No. 7 back contacts of relay 324d, No. 2 back contacts of relay 323c, No. 1 front contacts of relay 325e, to ground on conductor 251; (3) battery through the lower winding of relay 314d, No. 6 contacts of relay 324d, to ground on conductor 251; (4) battery through the lower winding of relay 332b, No. 1 contacts of relay 344d, No. 1 contacts of relay 343c, No. 1 contacts of relay 342b, No. 4 back contacts of relay 345e, to ground on conductor 251.

Thus the number 101 is registered in the accumulating registers and when, by the release of relays 228 and 229, ground is removed from conductors 249 and 251 and reapplied to conductor 247, the relays in all of the adding registers will release and the above-operated relays in the accumulating registers will be locked. It is believed not to be necessary to trace the further operations of the computer for additional charges, the above table of codes and illustrations of circuit operations already supplied being thought a sufficient guide for the tracing of other circuits for any number of other charges. We may note in passing, however, that relay 229 is provided with an upper continuity set of contacts by which, on the operation of the relay, ground is removed from conductor 247 and simultaneously applied to conductor 251 only for the purpose of reducing unnecessary operations of the relays of the accumulating registers in the transfer from the adding to the accumulating registers. At the time ground is removed from conductor 247 whatever relays of the accumulating register are locked thereto are theoretically free to release. But if any operated relay therein forms part of the registration of the transfer setting in going from the adding to the accumulating registers and this relay must be re-operated in this account, its release and reoperation would be pointless inasmuch as it gives the relay a certain amount of unnecessary wear and tear. Consequently by providing the circuit with means for releasing the holding circuit of these relays simultaneously with closing their operating circuits, those relays which must be reoperated need not release at all.

It will be further noted that the computer, as shown, comprises only a receiving register and hundreds, tens and units adding and accumulating registers. Should additional adding and accumulating registers be necessary as, for example, "thousands" adding and accumulating registers, the same would be identical with, say, the hundreds adding and accumulating registers, respectively, shown in Fig. 3, the upper coil of relay 345e being joined to the No. 4 armature of relay 331a and to the No. 4 and No. 5 stationary contacts of the relay in the thousands accumulating register which corresponds to relay 334d of the hundreds accumulating register, while the No. 1 armature of relay 331a would be joined to the No. 1 and No. 5 stationary springs of said relay.

The above operations are repeated as the tens tape advances to each succeeding record of the same line, similar operations taking place, of course, in all the other perforators which are handling line records routed thereto by the tens tape.

The tens tape thus moves to cause the continuous accumulation of all charges for the lines being analyzed by each one of the ten perforator circuits until it reaches the point where the first line feed code perforation is aligned above the sensing fingers 736 of the transmitter 710. This indicates that all call records for the ten separate lines in each of the perforators have been exhausted. The line feed code causes the operation of relay 102 in each of the ten perforators by virtue of the operation of relay 1102 in the units register (it being the first free register after the tens register in which the line feed code punched on the tens tape may be stored) and the consequent grounding of conductor 812. The following operations, therefore, occur in each of the perforators. Relay 102, in operating, completes a circuit for relay 222 which extends from battery through the winding of said relay, conductor 238, No. 2 front contacts of relay 126, (which was operated in parallel with relay 131 at the beginning of computer operations and locked to the No. 4 back contacts of relay 222 over conductor 205), No. 2 back contacts of relay 104, No. 2 contacts of relay 105, No. 2 contacts of relay 103, No. 2 contacts of relay 102, to ground on the No. 2 contacts of relay 101. Relay 222 operates and locks over its No. 3 contacts to ground on the No. 2 contacts of relay 225. It further opens the circuit of relays 106 and 107 which now release and closes a circuit for relay 132 extending from ground on the No. 1 back contacts of relay 224, No. 5 front contacts of relay 222, conductor 201, No. 1 back contacts of relay 130, winding of relay 132 to battery. Relay 132 operates and the ground on its No. 1 contact is extended via conductor 202, No. 1 front contacts of relay 222, No. 2 back contacts of relay 215, No. 3 back contacts of relay 217, No. 5 back contacts of relay 219, No. 5 back contacts of relay 221, to conductor 232. Now, depending upon the digit registered in relays 331a–334d of the hundreds accumulating register, the ground on said conductor 232 completes circuits to the punch-set magnets 1–5 of the perforator to set said perforator to punch that number. Thus if the total number of charges accumulated for the line is between one hundred and two hundred, the digit on the hundreds register relays of the accumulating register will be "1." According to the accumulating register code, relay 332b will be operated for the digit 1, and according to the perforator code, punch-set magnet 5 will have to be operated to punch the code of the digit 1 on the tape. Hence the application of ground on conductor 232 as above described completes a circuit over the No. 3 contacts of relay 332b, conductor 213, No. 2 back contacts of relay 221, No. 2 back contacts of relay 219, conductor 254, punch-set magnet 5, winding of relay 130 to battery. Punch-set magnet 5 and relay 130 operate in the manner described. A circuit for the punch magnet 133 is also completed while relay 132 is operated to ground on conductor 201 via the number 5 front contacts of relay 222 to ground on the back contacts of relay 224, causing said magnet to operate and punch the code of the digit 1. For any digit from 1 to 0, other relays in the group 331a–334d would be operated in accordance with the above accumulating register code and similar circuits to the one traced above would be closed for the appropriate punch-set magnets.

Thus, as another illustration, if the hundreds digit of the total number of accumulated charges is a "4," relays 332b, 333c and 334d would be operated. The perforator code of the digit 4, however, calls for the operation of punch-set magnets 3, 4 and 5. Hence three circuits would be closed as follows: (1) one circuit for punch-set magnet 5 as above traced; (2) another circuit for punch-set magnet 3 extending from ground on conductor 232, No. 3 contacts of relay 333c, conductor 230, No. 3 back contacts of relays 221 and 219, conductor 226, winding of punch-set magnet 3, winding of relay 130 to battery; (3) another circuit for punch-set magnet 4 would be closed extending from ground on conductor 232, No. 3 contacts of relay 334d, conductor 237, No. 4 back contacts of relays 221 and 219, No. 1 back contacts of relay 217, conductor 231, No. 1 back contacts of relay 215, conductor 255, winding of punch-set magnet 4 to battery. Punch-set magnets 3, 4 and 5 operate to set the perforator and punch magnet 133 then operates as described to punch the code of the digit 4.

When relay 132 releases subsequent to the punching of the hundreds digit stored in the hundreds accumulating register, a circuit is completed for relay 223 which extends from battery through the winding of said relay, No. 2 front contacts of relay 222, back contacts of relay 211, conductor 204, No. 2 back contacts of relay 132, No. 1 front contacts of relay 130, conductor 201, No. 5 front contacts of relay 222, to ground on the back contacts of relay 224. Relay 223 operates and closes an obvious circuit for slow-release relay 224 which also operates. This latter relay, on operating, opens the operating circuit of relay 223 and the locking circuit of relay 130 causing both of these relays to release (the latter also releasing the punch-set magnets locked in series with it) and closes a circuit for relay 220 which traces from battery through the winding of said relay, No. 6 back contacts of relay 221 to ground on the front contacts of relay 224. Relay 224 is made slow to release inasmuch as its circuit will be opened as soon as its own back contacts are opened. Relay 220 in operating applies operating ground through its contacts to one side of the winding of relay 221 which relay, however, remains short-circuited to ground on the No. 2 contacts of relay 225. When relay 224 releases, the short circuit is removed and relay 221 operates in the locking circuit of relay 220.

With the operation of relay 221, the conductors connected with the windings of the punch-set magnets 1–5 which, through the back contacts of relay 221, were extended to the contacts of relays 331a–334d of the hundreds accumulating register, are now, through the front contacts of relay 221, extended to the contacts of relays 311a–314d of the tens accumulating register. Depending upon the tens digit therein locked, which digit is the tens digit of the accumulated number of charges, easily traced circuit paths to the windings of the punch-set magnets may be followed by reference to the above accumulating register code as well as the above perforator code. With the setting of the punch-set magnets and the operation of relay 132 to ground on the back contacts of relay 224, the circuit of punch magnet 133 is completed and the code of the digit punched as previously described for other digits.

Upon the release of relay 132 the circuit of relay 223 is reclosed to cause the operation thereof, followed in turn by the operation of relay 224 whereupon relay 130 and the punch-set magnets release and a circuit is completed for relay 218 which may be traced from battery through the winding of said relay, No. 6 back contacts of relay 219, No. 6 front contacts of relay 221, front contacts of relay 224 to ground. Upon the release of relay 224, relay 219 operates in the locking circuit of relay 218 and the punch-set magnet conductors are joined to those included within the loop 240 which extend to the contacts of relays 411a–414d of the units accumulating register.

Depending upon the digit registered therein, appropriate punch-set magnet circuits are closed for operating the same in the manner already described for the hundreds digits. The circuit of punch magnet 133 is completed in the manner shown and the code of the digit is punched on the tape.

When subsequent to the punching of the code of the units digit, relay 224 operates again a circuit is completed for relay 216 which extends from battery through the winding of said relay, No. 4 back contacts of relay 217, No. 6 front contacts of relays 219 and 221, front contact of relay 224 to ground. Upon the release of relay 224 in the manner described, relay 217 operates in the locking circuit of relay 216, and since relay 132 operates again to ground on the back contacts of relay 224, the ground on the No. 1 contacts of relay 132 is now applied via No. 1 front contacts of relay 222, the No. 2 back contacts of relay 215, Nos. 3 and 2 front contacts of relay 217, conductor 239 to the winding of punch-set magnet No. 2. This punch-set magnet now operates in series with the winding of relay 130, and, upon the release of relay 132, the circuit of the punch magnet 133 is completed whereupon a hole is punched in position 2 of the tape. According to the above perforator code, a punch in position 2 is the "line feed" code and is utilized, when the final tape is subsequently used with a suitable tabulating device to produce a bill, to advance the bill form to the next line prior to returning the printer carriage to its starting position.

Upon the reoperation of relay 224 in the manner described, a circuit is completed for relay 214 which extends from battery through the winding of said relay, No. 3 back contacts of relay 215, No. 4 front contacts of relay 217, No. 6 front contacts of relays 219, and 221, front contacts of relay 224 to ground. Relay 214 operates and, upon the release of relay 224, causes relay 215 to operate in its locking circuit. With the release of relay 224, relay 132 reoperates and the ground through its No. 1 contacts is now applied over No. 1 front contacts of relay 222, the Nos. 2 and 1 contacts of relay 215 and conductor 255 to complete the circuit of punch-set magnet 4 and relay 130 whereupon the "carriage return" code is perforated on the tape for use by the tabulating device to return the carriage to its starting position for tabulating the charges of the next number.

Upon reoperation of relay 224 subsequent to the punching of the carriage return code, a circuit is completed for relay 225 extending from battery through the winding of said relay, No. 3 front contacts of relay 215, No. 4 front contacts of relay 217, No. 6 front contacts of relays 219 and 221, front contacts of relay 224 to ground. Relay 225 operates, locks itself to ground on the No. 4 front contacts of relay 222, and opens its Nos. 2 and 3 back contacts thereby opening the circuit of all relays locked thereto, causing said relays to release. When relay 222 releases, relay 225 releases provided, however, that ground is disconnected from conductor 235 by the release of relay 222 in every other one of the nine perforators. All perforators and computer circuits are thus restored to normal and the operations above described are then repeated for the next series of numbers on the tens tape up to the succeeding carriage return code punched thereon.

The final tape has somewhat the appearance schematically shown in Fig. 17, understanding that the first four digits transverse the tape represent the line number and that the following three digits represent the total charges for the line. The charge notation is then followed by the line feed code (LF) and the carriage return code (CR) which, as above explained, are used respectively to advance the bill form and return the tabulating device operated in response to the final tape. Fig. 17A shows the manner in which the various notation of the final tape are disposed thereon, the space between the line numbers and their corresponding total charges not appearing on the actual tape.

While I have described my invention in connection with a specific application thereof, it is understood that various other applications and embodiments thereof may be made by those skilled in the art without departing from the spirit of the invention as defined within the scope of the appended claims.

What is claimed is:

1. A record controlled system for analyzing and reproducing a tape prepunched to record plural digit numbers comprising in combination a means for sensing said tape, a plurality of registers settable in response thereto, a perforator controllable by said registers, means controlled by one of said registers when set to a predetermined digit for placing said perforator under control of said registers, means operably associated with said perforator and responsive to the setting of said registers for causing said perforator to reproduce the codes registered in said registers, and other means also operably associated with said perforator and controlled by one of said registers for preventing the operation of said perforator for one of the digits of the succeeding number if the value of said digit is the same as the value of the predetermined digit in the preceding number which caused said perforator to be placed under the control of said registers.

2. A record controlled system for analyzing and reproducing a tape prepunched to record five digit numbers and an arbitrary character after each number, comprising in combination a means for sensing said tape, a plurality of registers each settable respectively in response to the sensing of a digit and said arbitrary character, a perforator controllable by said registers, means controlled by one of said registers when set to a predetermined digit for placing said perforator under the control of said registers, means operably associated with said perforator and responsive to the setting of each of said registers for causing said perforator to reproduce each of the digits registered therein including the arbitrary character, and other means operably associated with said perforator and controlled by the register settable in response to said arbitrary character for preventing said perforator from reproducing the first digit of the succeeding number if the value of said digit is the same as the value of the first digit in the preceding number which caused said perforator to be placed under the control of said registers.

3. In a record controlled system in combination with tape sensing means and a tape perforated according to a five-unit code to indicate various groups of digits and characters of which one is perforated at the end of every group of digits to indicate the termination thereof, of a plurality of registers settably responsive to the operation of said sensing means in sensing a group of digits including said terminating character to register the same, and a perforator circuit for reperforating the codes of said groups of registered digits and the codes of succeeding groups of digits except the first digit in each group if said digit is identical in value with that of the first digit in the first group perforated, said perforator circuit comprising a perforator having a plurality of punch-set magnets and a punch magnet, an auxiliary register, means for operatively connecting said auxiliary register in succession with each of said settable registers, circuits completed in response to the operation of said last-mentioned means whereby the code of a digit in a register is reproduced in said auxiliary register, means for operating the punch-set magnets of said perforator in accordance with the setting of said auxiliary register, means responsive to the operation of said punch-set magnets for operating said punch magnet to perforate the code of each of the digits, a pair of relays operatively responsive to the code of the terminating character, and means responsive to said pair of relays on the registration of the first digit of a succeeding group of digits in said auxiliary register whereby the circuit of said punch magnet is completed only upon the registration of the second digit in said group.

4. In a record controlled system, in combination a plurality of registers settably responsive to prepunched tape perforated according to a five-unit code to designate groups of digits and a terminating character at the end of each group, a plurality of perforator circuits each including an associated perforator, circuits controlled by one of said registers for selecting a perforator circuit in accordance with the first digit of a group, means in said selected perforator circuit responsive to said registers for causing the associated perforator to punch all the digits in the first group including the terminating character, tape sensing means, means controlled thereby for causing the registers to be successively set up in accordance with succeeding groups of digits, and means in said perforator circuit responsive to the register which is set in accordance with said terminating character for causing said associated perforator to skip the punching of the first digit in succeeding groups.

5. A computing circuit for a combined distributing and reproducing mechanism comprising in combination with means for sensing a perforated tape containing a series of charge digits to be added together and a perforator, of a digit receiving register settable in response to each charge digit as sensed by said sensing means, an accumulating register having a numerical setting therein, an adding register, circuits completed by said receiving register and said accumulating register for setting said adding register to the total of the settings of said receiving register and said accumulating register, tens carry means between the different digital orders of said accumulating and adding registers; means responsive to the setting of said adding register for setting said accumulating register to the total in said adding register, successive settings of said adding register in response to successive settings of said digit receiving register being effected through said accumulating register as successively set by the previous setting of said adding register, and means for operating said perforator to punch the total in said accumulating register.

6. Record controlled apparatus operative in response to a perforated record containing the record of a plurality of designations representing the line numbers of telephone connections established therefrom and a record of the number of unit charges assessed for each connection, comprising record sensing means, a plurality of registers settable in response to said record sensing means sensing said record, a plurality of perforator circuits, each including a perforator controlled thereby, means responsive to the setting of one of said registers for selecting one of said perforator circuits for connection to said registers, means in said connected perforator responsive to the setting of said registers for punching said line designations upon a tape, and a computer for each perforator circuit responsive to each call charge designation associated with the same line designation comprising an accumulating register preset to a digit, a digit receiving register responsive to each charge designation received by said perforator circuit for registering the digital value thereof, an adding register, circuits completed between said digit receiving register, said accumulating register and said adding register for setting said last-mentioned register to the sum of the digits registered in said digit receiving register and said accumulating register, means operative subsequent to said perforator circuit having received said charge designation for resetting said accumulating register to the sum in said adding register and for thereafter restoring said receiving and adding registers to normal, and means in said perforator circuit for operating said perforator to punch on said tape a record of the total charges for a line number as registered in said accumulating register following the punching of said line number.

7. In a record controlled system, means for sensing perforations in a record containing perforations of a first plural digit number and succeeding numbers, each succeeding number having the same number of digits but less digits than said first plural digit number, means for advancing the record over said sensing means, a plurality of registers, one for each digit of said plural digit number, means controlled by said sensing means for respectively setting each of said registers in accordance with the digits of said first plural digit number, means settable in accordance with the number of digits in said succeeding numbers, and means individual to each of the registers corresponding to a digit sensed in the first number which is missing in succeeding numbers and operably controlled by the settable means for locking said last-mentioned registers.

8. In a distributing and reproducing system, apparatus for distributing groups of digits in a prepunched tape according to a group digit in each of said groups, comprising means for sensing the tape, a plurality of registers each settably responsive to said sensing means for registering therein a digit sensed thereby, a plurality of perforators, means settable in accordance with the group digit, means under the joint control of said settable means and the one of said registers which has the group digit of a group of digits registered therein for selecting one of said perforators, means for connecting in succession said selected perforator to each of said registers when set, means effective after each connection of a register to said perforator for operating said perforator to perforate upon a tape the digits registered in said register, and means individual to each of said perforators and effective after a perforator has been taken into use to perforate one group of digits for skipping the perforation of the group digit in succeeding groups of digits which are to be perforated by said perforator.

9. A combined distributing, reproducing and tabulating mechanism comprising means for sensing a perforated record containing a series of plural digit numbers each accompanied by a separate digit which is to be added to a corresponding digit in the same number when and if the latter number appears more than once on said perforated record, a plurality of means for receiving a registration of each of the digits of said numbers and said separate digit in response to said sensing, a plurality of manually settable means each settable for different digits according to the digital order by which said numbers are to be grouped and regrouped, a plurality of perforators each selectable jointly by one of said settable means and one of said receiving means in accordance with the value of different grouping digits for punching on a tape all the numbers in the series belonging to a particular group, means operably associated with each of said perforators and responsive to the receiving means set in response to said separate digits for adding up the separate digits of identical numbers in the group, and means individual to each of said perforators and controlled by said adding means for causing the perforator to perforate upon said tape the total of said separate digits opposite the punched number to which they belong.

10. A combined distributing, reproducing and tabulating mechanism comprising means for sensing a perforated record of a series of plural digit numbers each accompanied by a separate digit which is to be added to a corresponding digit in the same number when and if the latter number appears more than once on said perforated record, a plurality of means for receiving said numbers in response to said sensing, a plurality of means each manually settable according to the descending digital order by which said numbers are to be grouped, a plurality of perforators each jointly selectable by one of said manually settable means when set and one of said receiving means for punching on a tape all of the numbers in the series belonging to a particular group, and means operably associated with each of said perforators for adding up the separate digits of identical numbers in the group, said means comprising a receiving register operably responsive to each setting of the one of said receiving means which is set in response to each of the separate digits for the same number, an accumulating register preset to an initial zero setting, an adding register responsive to said receiving register and said accumulating register for totaling the sum in said receiving register and said accumulating register, and means responsive to said adding register for resetting said accumulating register to the total in said adding register, and means associaed with each perforator for operating said perforator to punch on said tape the total on said accumulating register after the sensing of the last appearance of the number on said perforated record.

11. A distributing and reproducing mechanism by which a series of plural digit numbers on a perforated record are grouped and regrouped in consecutive numerical order on as many records as is indicated by the value of the last digit in each of said numbers, comprising in combination a sensing means for analyzing said record, a plurality of receiving means settable in response thereto, a plurality of perforator circuits each including a perforator controlled thereby and each designated by a digital value, means settable in accordance with the digital order by which said numbers are to be regrouped, means jointly responsive to the setting of said settable means and to the one of said receiving means which is set in response to the sensing of the grouping digit for selecting the one of said plurality of perforator circuits which is designated by the digital value of the grouping digit, means for successively connecting said perforator circuit to each one of said receiving means, means in said perforator circuit successively responsive to the setting of each of said receiving means for operating the associated perforator to reproduce the entire first number stored in said plurality of receiving means, and storage means in said perforator circuit responsive to the setting of one of said receiving means for causing said associated perforator to skip the perforation of the grouping digit of each number in the group on each subsequent connection of said perforator circuit to said plurality of receiving means in response to the setting of the latter for each number having the same numerical value in the grouping digit.

12. In a record controlled system, means for sensing perforations in a perforated record including means for advancing the record over said sensing means, a plurality of registers, means for connecting each of said registers with sensing means for operating said registers in response to successive columns of perforations, a magnet for controlling said record advancing means, and means in each of said registers operative upon the setting thereof for operating said connecting means and said magnet whereby the operation of said connecting means connects said record sensing means to the next register and whereby the operation of said magnet advances the record to a succeeding column of perforations for alignment over said sensing means.

13. In a record controlled system, means for sensing perforations in a perforated record including means for advancing the record over said sensing means, said perforations being arranged in columns, a plurality of registers, a stepping switch, means individual to each register and operated over said stepping switch for establishing partial circuit paths between the associated register and said sensing means, said control paths being completed by said sensing means under control of a column of perforations, means effective upon the completion of said circuit paths for operating said record advancing means to advance the record to a succeeding column of perforations for alignment over said sensing means, and other means also effective upon the completion of said circuit paths for operating said stepping switch whereby the means individual to the next successive register is operated for establishing partial circuit paths between said next successive register and said sensing means.

14. In a record controlled system, a tape perforated in accordance with a predetermined code representing plural digit numbers, an intermittent tape feeding means including means for sensing the perforations in the punched tape, a plurality of tape perforators each including a plurality of punch-set magnets and a punch magnet, a plurality of registers each operative in response to the sensing of a code by said sensing means for registering said code therein, means under control of one of said registers for selectively connecting one of said tape perforators to said registers, means responsive to the selection of said tape perforator for operating the punch-set magnets thereof in accordance with the setting of a register, means serially responsive to the operation of said punch-set magnets for operating the punch magnet to perforate the code registered in said register, means for causing the punch-set magnets of said tape perforator to be operated in succession in accordance with the setting of each of the other registers to completely perforate the first number set up thereon, storage means responsive to the completion of perforating of said first number, said serially responsive means being effective to operate the punch magnet to perforate the code designated by each of said settings, means responsive to the release of said serially responsive means subsequent to the perforation of the last digit of the first number for releasing the registration in all registers except those preceding the register which caused the selection of said tape perforator, means for causing said perforator to skip said unreleased registers, said released registers being responsive to the operation of said sensing means in sensing subsequently the perforations of following numbers, and means controlled by said storage means for preventing said perforator from perforating the digit registered in the register which caused the selection of the perforator, whereby said tape perforator is caused to be reselected under the control of the same register which caused its first selection to perforate all codes except those in the unreleased registers and said same register, said storage means being effective to prevent said perforator from perforating the digit registered in said same register.

15. In a distributing and reproducing system, apparatus for distributing groups of digits on a prepunched tape according to a group digit in each of said groups, comprising means for sensing the tape, a plurality of registers each settably responsive to said sensing means for registering therein a digit sensed by said sensing means, a plurality of perforators, means controllable by any one of said registers for selecting a perforator in accordance with the value of the digit registered in the register, means settable in accordance with the grouping digit for placing said last mentioned means under control of the one of said registers which has the grouping digit registered therein, means for connecting said selected perforator successively to each of said registers in a descending digital order, and means operably associated with said perforator responsive to each of said registers for causing said perforator to perforate upon a tape the digits registered in said register.

16. In a distributing and reproducing system, apparatus for distributing and redistributing groups of numbers punched upon a tape according to the thousands, hundreds, tens and units digits of each of said numbers, comprising means for sensing the perforations on said tape and means for advancing said tape, a thousands, hundreds, tens and units register each settably responsive to said sensing means for registering therein the digits of a number as the perforations of each digit of said number are sensed by said sensing means, ten perforators, means settable in accordance with the successive digital orders by which said groups of numbers are to be distributed or redistributed, means for selecting one of said perforators under the joint control of said settable means and the register corresponding to the digital order to which said settable means has been set, the perforator being selected in accordance with the digital value of the setting of said register, means controlled by said settable means on successive redistribution according to descending digital orders of a tape prepared as a result of the preceding distributing operation for locking in the respective registers the digit in the order used in the prior distributing operation, means for causing the selected perforator to become connected successively to each of said registers whereby said perforator will perforate the first number, means for causing said connecting means on subsequent distribution of the numbers in the same order of distribution to skip the connection to registers which are locked by said locking means, whereby said perforator skips the perforation of the digits locked in the registers to which it is not connected and perforates the digits in the registers which are not so locked.

17. A computing circuit for a combined distribution and reproducing mechanism comprising in combination with means for sensing a perforated record containing a series of digits to be added together, and an arbitrary code perforated at the end of said digits to designate the end of the adding operations, a perforator circuit including a perforator controlled thereby, said perforator circuit including means for receiving each of said digits and said arbitrary code when sensed by said sensing means, an accumulating register, means for operating the accumulating register to register zero in each order thereof, a digit receiving register settable in response to each digit as received by said perforator circuit, an adding register, circuits completed by said receiving register and said accumulating register for setting said adding register to the total of the settings of said accumulating register and said adding register, circuits thereafter completed by said adding register for setting said accumulated register to the total in said adding register, said adding register being thereafter responsive to each total setting of said accumulating register and a setting of said digit receiving register for adding the new total thereof, means in said perforator circuit responsive to the reception of said arbitrary code for operating said perforator to punch the total registered in said accumulating register, and means responsive to said operation of said perforator for restoring said accumulating register to its unoperated condition.

SAMUEL B. WILLIAMS.